(12) United States Patent
Kwon et al.

(10) Patent No.: US 12,198,862 B2
(45) Date of Patent: Jan. 14, 2025

(54) MULTILAYER ELECTRONIC COMPONENT

(71) Applicant: SAMSUNG ELECTRO-MECHANICS CO., LTD., Suwon-si (KR)

(72) Inventors: Yeong Lim Kwon, Suwon-si (KR); Soo Hwan Son, Suwon-si (KR); Jung Min Park, Suwon-si (KR); Se Hun Park, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 5 days.

(21) Appl. No.: 17/957,017

(22) Filed: Sep. 30, 2022

(65) Prior Publication Data

US 2023/0110409 A1    Apr. 13, 2023

(30) Foreign Application Priority Data

Oct. 7, 2021 (KR) .................. 10-2021-0133381
Aug. 19, 2022 (KR) .................. 10-2022-0104109

(51) Int. Cl.
  *H01G 4/30*   (2006.01)
  *H01G 4/008*   (2006.01)
  (Continued)

(52) U.S. Cl.
  CPC .............. *H01G 4/30* (2013.01); *H01G 4/008* (2013.01); *H01G 4/012* (2013.01); *H01G 4/1227* (2013.01); *H01G 4/224* (2013.01)

(58) Field of Classification Search
  CPC ...... H01G 4/008; H01G 4/012; H01G 4/1227; H01G 4/224; H01G 4/30
  See application file for complete search history.

(56) References Cited

U.S. PATENT DOCUMENTS 10,699,850 B2    6/2020   Lee et al.
2015/0318109 A1  11/2015  Lee et al.
(Continued)

FOREIGN PATENT DOCUMENTS

KR    10-2014-0088746 A    7/2014
KR    10-2015-0125443 A    11/2015
(Continued)

*Primary Examiner* — Nathan Milakovich
(74) *Attorney, Agent, or Firm* — Morgan, Lewis & Bockius LLP

(57) ABSTRACT

A multilayer electronic component includes a plurality of capacitance forming portions including a first dielectric layer and an internal electrode disposed in a first direction, and an intermediate layer disposed between capacitance forming portions adjacent to each other and including a second dielectric layer, a body including first and second surfaces opposing each other in the first direction, third and fourth surfaces connected to the first and second surfaces and opposing each other in a second direction, and fifth and sixth surfaces connected to the first to fourth surfaces and opposing each other in a third direction; and an external electrode disposed on the body and connected to the internal electrode. The second dielectric layer includes graphene. The first dielectric layer does not include graphene, or includes graphene in a content less than a content of graphene included in the second dielectric layer.

29 Claims, 15 Drawing Sheets

(51) Int. Cl.
*H01G 4/012* (2006.01)
*H01G 4/12* (2006.01)
*H01G 4/224* (2006.01)

(56) References Cited

U.S. PATENT DOCUMENTS

2019/0272955 A1* 9/2019 Oh ..................... H01G 4/2325
2019/0333699 A1* 10/2019 Lee .................... H01G 4/1281
2020/0152389 A1* 5/2020 Kim .................... H01G 4/012
2020/0176187 A1* 6/2020 Choi ................... H01G 4/008

FOREIGN PATENT DOCUMENTS

| KR | 20190031928 A | * | 3/2019 |
| KR | 10-2019-0121226 A | | 10/2019 |
| KR | 10-2019-0125876 A | | 11/2019 |

\* cited by examiner

K1

K2

VI-VI'

MULTILAYER ELECTRONIC COMPONENT

CROSS-REFERENCE TO RELATED APPLICATION(S)

This application claims benefit of priority to Korean Patent Application No. 10-2021-0133381 filed on Oct. 7, 2021 and Korean Patent Application No. 10-2022-0104109 filed on Aug. 19, 2022 in the Korean Intellectual Property Office, the disclosures of which are incorporated herein by reference in their entirety.

TECHNICAL FIELD

The present disclosure relates to a multilayer electronic component.

BACKGROUND

A multilayer ceramic capacitor (MLCC), a multilayer electronic component, is a chip-type condenser mounted on the printed circuit boards of a variety of electronic products including imaging devices, such as a liquid crystal display (LCD), a plasma display panel (PDP), and the like, computers, smartphones, mobile phones, and the like, and may be configured to charge or discharge the devices.

A multilayer ceramic capacitor may be used as a component of various electronic devices as a multilayer ceramic capacitor is relatively small in size, may secure high capacitance and may be easily mounted. As electronic devices such as computers, mobile devices, and the like, have been designed to have reduced sizes and to operate at high power, there has been increased demand for miniaturization and high capacitance of multilayer ceramic capacitors.

Also, as interest in automotive electronic components has increased recently, a multilayer ceramic capacitor may also be required to have high reliability properties to be used in automobiles or infotainment systems.

A multilayer ceramic capacitor may have a structure in which a plurality of dielectric layers and internal electrodes having different polarities are alternately laminated between the dielectric layers. In this case, the dielectric layer may have piezoelectricity in which a voltage is generated when a pressure is applied, and electrostrictive properties in which pressure is generated when a voltage is applied.

Accordingly, when a DC or AC voltage is applied to a multilayer ceramic capacitor, stress may be generated between the internal electrodes, and electrostrain cracks may occur in the multilayer ceramic capacitor due to ceramic having highly brittleness, such that reliability of the multilayer ceramic capacitor may be deteriorated.

To address the issue above, generally, a method of improving strength of a multilayer ceramic capacitor by inserting a buffer ceramic layer into a center of the multilayer ceramic capacitor has been applied, but there may be a problem in that capacitance of the multilayer ceramic capacitor may be excessively decreased due to a buffer ceramic layer having a relatively great thickness.

Accordingly, studies into effectively improving strength of a multilayer ceramic capacitor without excessively decreasing capacitance of the multilayer ceramic capacitor has been necessary.

SUMMARY

An aspect of the present disclosure is to provide a multilayer electronic component having high-reliability by having high-strength.

Another aspect of the present disclosure is to provide a multilayer electronic component having improved capacitance.

Another aspect of the present disclosure is to improve a multilayer electronic component having improved moisture resistance reliability and improved breakdown voltage.

According to an aspect of the present disclosure, a multilayer electronic component includes a plurality of capacitance forming portions including a first dielectric layer and an internal electrode disposed in a first direction, and an intermediate layer disposed between first and second capacitance forming portions among the plurality of capacitance forming portions and including a second dielectric layer; a body including first and second surfaces opposing each other in the first direction, third and fourth surfaces connected to the first and second surfaces and opposing each other in a second direction, and fifth and sixth surfaces connected to the first to fourth surfaces and opposing each other in a third direction; and an external electrode disposed on the body and connected to the internal electrode. The second dielectric layer includes graphene. The first dielectric layer does not include graphene, or includes graphene in a content lower than a content of graphene included in the second dielectric layer.

According to an aspect of the present disclosure, a multilayer electronic component includes a plurality of capacitance forming portions including a first dielectric layer and an internal electrode disposed in a first direction, and an intermediate layer disposed between first and second capacitance forming portions among the plurality of capacitance forming portions and including a second dielectric layer; a body including first and second surfaces opposing each other in the first direction, third and fourth surfaces connected to the first and second surfaces and opposing each other in a second direction, and fifth and sixth surfaces connected to the first to fourth surfaces and opposing each other in a third direction; and an external electrode disposed on the body and connected to the internal electrode. The second dielectric layer includes graphene. $t3<t1$ is satisfied, in which $t1$ is an average thickness of the intermediate layer and $t3$ is an average thickness of the first dielectric layer.

According to an aspect of the present disclosure, a multilayer electronic component includes first and second capacitance forming portions including a first dielectric layer and an internal electrode disposed in a first direction, and an intermediate layer disposed between the first and second capacitance forming portions and including a second dielectric layer; a body including first and second surfaces opposing each other in the first direction, third and fourth surfaces connected to the first and second surfaces and opposing each other in a second direction, and fifth and sixth surfaces connected to the first to fourth surfaces and opposing each other in a third direction; and an external electrode disposed on the body and connected to the internal electrode. The second dielectric layer includes graphene. $D2<D1$ is satisfied, in which $D1$ is an average particle size of grains of the first dielectric layer, and $D2$ is an average particle size of grains of the second dielectric layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
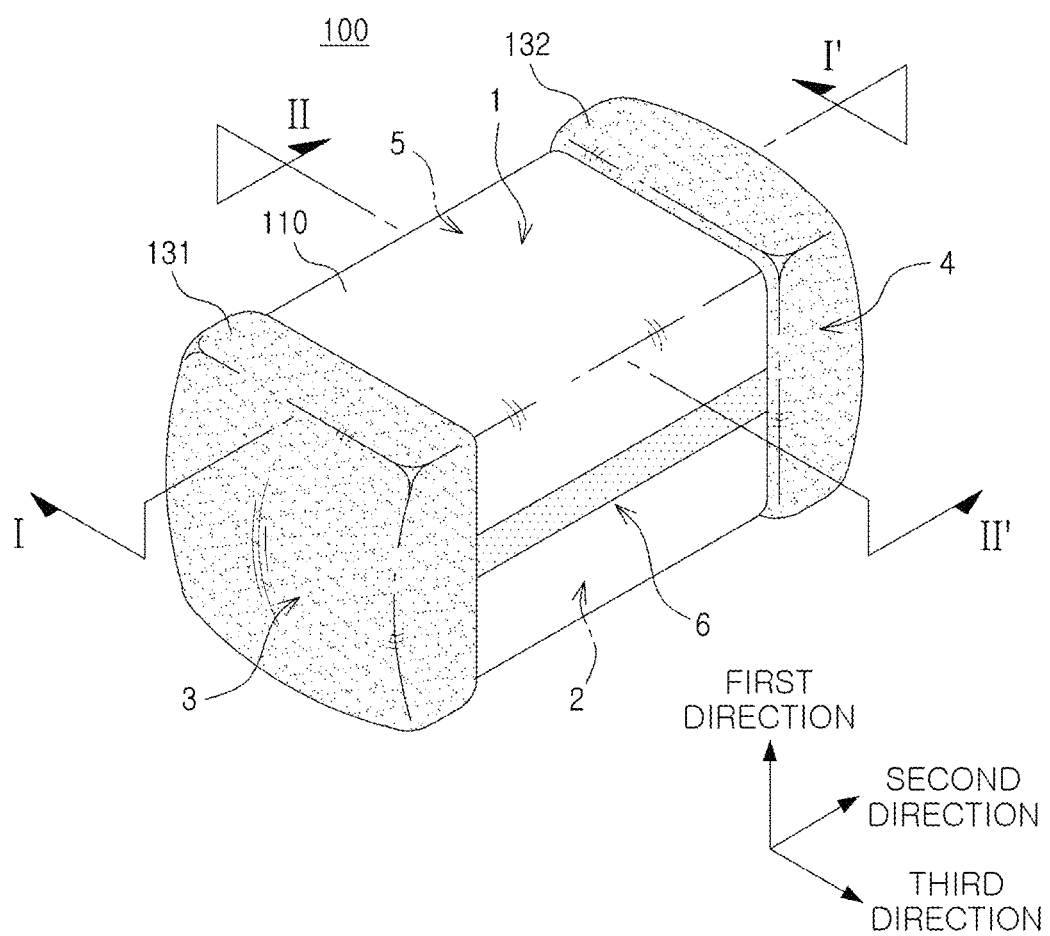
FIG. 1 is a perspective diagram illustrating a multilayer electronic component according to an example embodiment in the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided such that this disclosure will be thorough and complete, and will fully convey the scope of the disclosure to those skilled in the art. Accordingly, shapes and sizes of elements in the drawings may be exaggerated for clarity of description, and elements indicated by the same reference numeral are the same elements in the drawings.

In the drawings, certain elements may be omitted to allow the present disclosure to be clearly described, and to clearly express a plurality of layers and regions, thicknesses may be magnified. The same elements having the same function within the scope of the same concept will be described using the same reference numerals. Further, throughout the specification, it will be understood that when a portion "includes" an element, it may further include another element, not excluding another element, unless otherwise indicated.

In the drawing, an X direction is a second direction, an L direction, or a length direction, a Y direction is a third direction, a W direction, or a width direction, and a Z direction is a first direction, a layering direction, a T direction, or a thickness direction.

Multilayer Electronic Component

FIG. 1 is a perspective diagram illustrating a multilayer electronic component according to an example embodiment.

Figure 2:
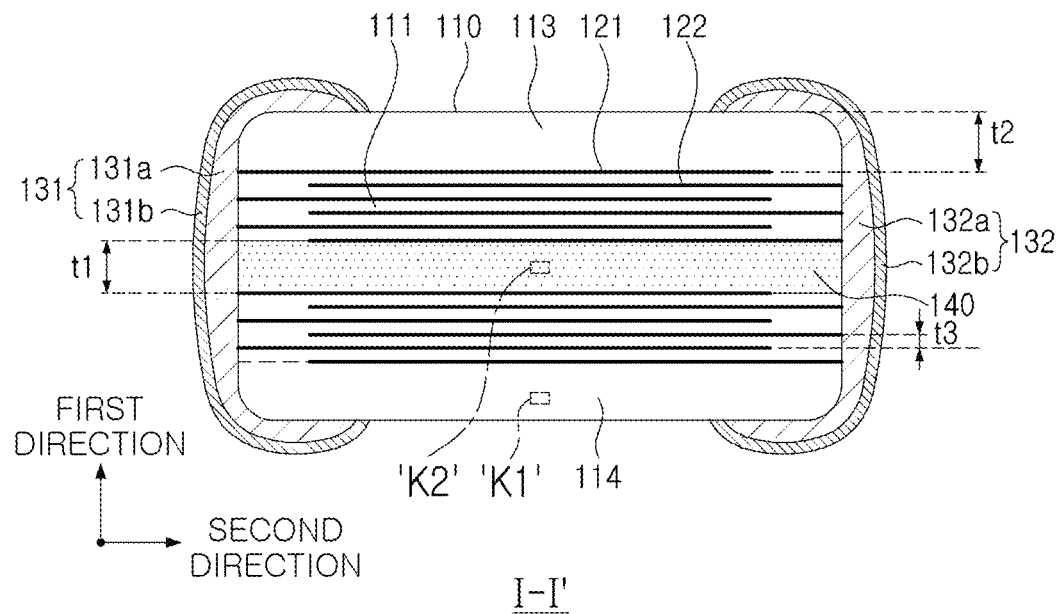
FIG. 2 is a cross-sectional diagram taken along line I-I' in FIG. 1.

FIG. 2 is a cross-sectional diagram taken along line I-I' in FIG. 1.

Figure 3:
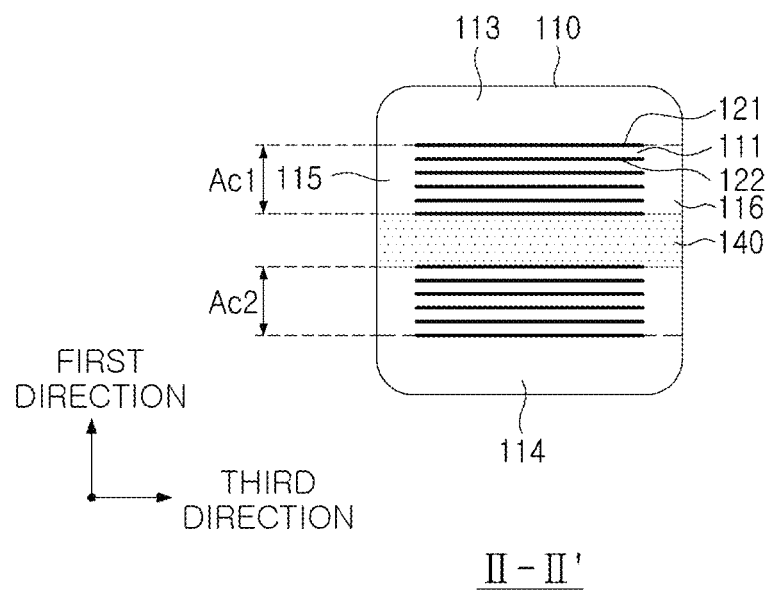
FIG. 3 is a cross-sectional diagram taken along line II-II' in FIG. 1.

FIG. 3 is a cross-sectional diagram taken along line II-II' in FIG. 1.

Figure 4:
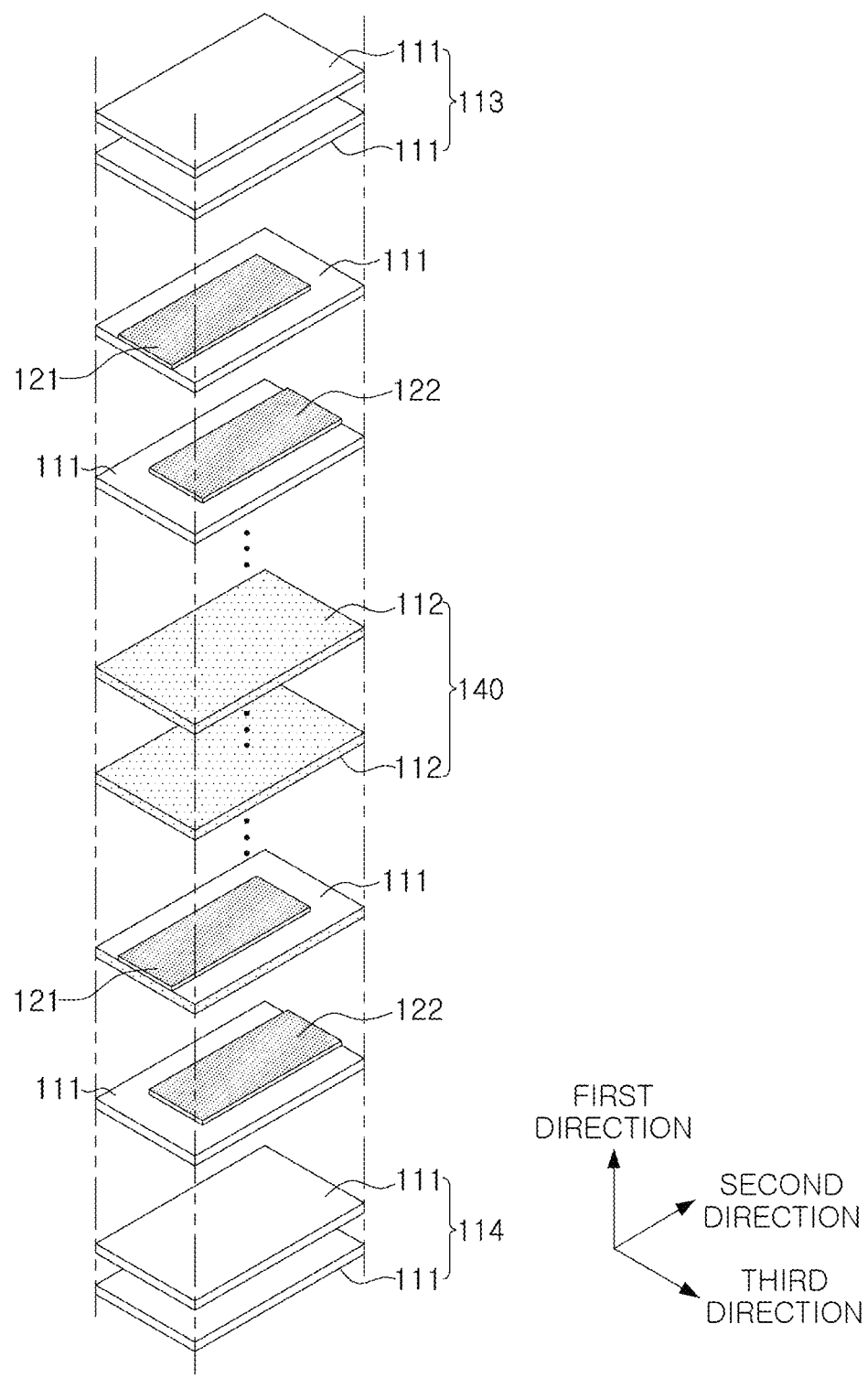
FIG. 4 is an exploded perspective diagram illustrating a body of a multilayer electronic component according to an example embodiment in the present disclosure.

FIG. 4 is an exploded perspective diagram illustrating a body of a multilayer electronic component according to an example embodiment.

Referring to FIGS. 1 to 4, a multilayer electronic component 100 in an example embodiment may include a plurality of capacitance forming portions Ac1 and Ac2 including first dielectric layers 111 and internal electrodes 121 and 122 alternately disposed in a first direction, and an intermediate layer 140 disposed between capacitance forming portions Ac1 and Ac2 adjacent to each other and including a second dielectric layer 112, a body 110 including first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first to fourth surfaces 1 to 4 and opposing each other in a third direction, and external electrodes 131 and 132 disposed on the body 110 and connected to the internal electrodes, and the second dielectric layer 112 may include graphene, and the first dielectric layer 111 may not include graphene or may include graphene in a content lower than the content of graphene included in the second dielectric layer 112.

As described above, in a multilayer ceramic capacitor, which is a multilayer electronic component, electrostrain cracks may occur when a voltage is applied due to a dielectric layer having piezoelectricity and electrostrictive properties, and accordingly, reliability of the multilayer ceramic capacitor may be deteriorated.

The multilayer electronic component 100 in an example embodiment may include an intermediate layer 140 disposed between capacitor forming portions Ac1 and Ac2 adjacent to each other and including a second dielectric layer 112, and the second dielectric layer 112 may include graphene, such that strength and reliability of the multilayer electronic component 100 may improve.

Also, the first dielectric layer 111 may not include graphene or may include graphene in a content lower than the content of graphene included in the second dielectric layer 112, thereby preventing deterioration of moisture resistance reliability and breakdown voltage.

Hereinafter, the components included in the multilayer electronic component 100 in an example embodiment will be described in greater detail.

The body 110 may not be limited to any particular shape. As illustrated, the body 110 may have a hexahedral shape or a shape similar to a hexahedron. Due to contraction of a ceramic powder included in the body 110 or grinding of edges during a sintering process, the body 110 may not have an exactly hexahedral shape with straight lines, but may have a substantially hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1 to 4 and opposing each other in a third direction.

The body 110 may include a plurality of capacitance forming portions Ac1 and Ac2 in which capacitance is formed by including a first dielectric layer 111 and internal electrodes 121 and 122 alternately disposed in the first direction. The capacitance forming portions Ac1 and Ac2 adjacent to each other may be arranged in the first direction with the intermediate layer 140 interposed therebetween, for example.

The plurality of first dielectric layers 111 forming the capacitance forming portions Ac1 and Ac2 may be in a fired state, and a boundary between the dielectric layers 111 adjacent to each other may be integrated with each other such that the boundary may not be distinct without using a scanning electron microscope (SEM).

The first dielectric layer 111 may be formed by preparing a ceramic slurry including ceramic powder, an organic solvent, an additive, and a binder, preparing a ceramic green sheet by coating the slurry on a carrier film and drying the slurry, and firing the ceramic green sheet. The ceramic powder is not limited to any particular example as long as sufficient electrostatic capacitance may be obtained therewith. For example, a barium titanate ($BaTiO_3$) powder may be used.

An average thickness t3 of the first dielectric layer 111 may not be limited to any particular example. To obtain miniaturization and high capacitance of the multilayer electronic component 100, the number of laminated layers may need to be increased by reducing the thickness of the first dielectric layer 111. However, cracks may be easily created in the body 110 due to the stress generated while a voltage is applied, and accordingly, reliability of the multilayer electronic component 100 may be deteriorated.

The multilayer electronic component 100 in an example embodiment may include the intermediate layer 140 disposed between the plurality of capacitance forming portions Ac1 and Ac2, and accordingly, high strength may be obtained such that, even when the thickness of the dielectric layer 111 is relatively thin, cracks may be prevented and reliability may improve. Accordingly, the average thickness t3 of the first dielectric layer 111 may be 0.4 µm or less, and in this case, the effect of preventing cracks and improving reliability in an example embodiment may improve.

Here, the average thickness t3 of the first dielectric layer 111 may refer to an average thickness of the first dielectric layer 111 disposed between the internal electrodes 121 and 122. The average thickness t3 of the first dielectric layer 111 may be measured by scanning the cross-sections of the body 110 in the first direction and the second direction using a scanning electron microscope (SEM) with a magnification of 10,000. More specifically, the average value may be measured by measuring the thicknesses at a plurality of points of one first dielectric layer 111, such as, for example, at 30 points spaced apart by an equal distance in the second direction. The 30 points spaced apart by an equal distance may be designated in the capacitance forming portions Ac1 and Ac2. Also, the average thickness of the first dielectric layer 111 may be further generalized by extending the measurement of the average value to ten first dielectric layers 111.

The internal electrodes 121 and 122 may be alternately disposed with the first dielectric layer 111, and for example, the first internal electrode 121 and the second internal electrode 122, a pair of electrodes having different polarities, may be disposed to oppose each other with the first dielectric layer 111 interposed therebetween. The plurality of first internal electrodes 121 and the plurality of second internal electrodes 122 may be electrically isolated from each other by the first dielectric layer 111 disposed therebetween.

The internal electrodes 121 and 122 may be disposed to be spaced apart from the fifth and sixth surfaces 5 and 6 of the body 110, and may be disposed to be connected to the third or fourth surfaces 3 and 4. For example, the plurality of first internal electrodes 121 may be spaced apart from the fourth to sixth surfaces 4, 5, and 6, respectively, and may be connected to the third surface 3. The plurality of second internal electrodes 122 may be disposed to be spaced apart from the third surface, the fifth surface, and the sixth surface 3, 5, and 6, respectively, and may be connected to the fourth surface 4.

The conductive metals included in the internal electrodes 121 and 122 may be one or more of nickel (Ni), copper (Cu), palladium (Pd), silver (Ag), gold (Au), platinum (Pt), tin (Sn), tungsten (W), titanium (Ti), and alloys thereof, but an example embodiment thereof is not limited thereto.

The internal electrodes 121 and 122 may be formed by applying a conductive paste for an internal electrode including a conductive metal on a ceramic green sheet by a predetermined thickness and firing the conductive paste. Also, the capacitor forming portions Ac1 and Ac2 may be formed by laminating and firing the ceramic green sheet coated with the conductive paste for an internal electrode. As a method of printing the conductive paste for an internal electrode, a screen-printing method or a gravure printing method may be used, but an example embodiment thereof is not limited thereto.

The average thickness of the internal electrodes 121 and 122 may not be limited to any particular example. In this case, the thickness of the internal electrodes 121 and 122 may refer to the size of the internal electrodes 121 and 122 in the first direction. As described above, the multilayer electronic component 100 in an example embodiment may have high strength by including include the intermediate layer 140 disposed between the plurality of capacitance forming portions Ac1 and Ac2, such that, even when the internal electrodes 121 and 122 have a thin thickness, cracks may be prevented and reliability may improve. Accordingly, the average thickness of the internal electrodes 121 and 122 may be 0.4 µm or less, and in this case, the effect of preventing cracks and improving reliability in an example embodiment may improve.

Here, the average thickness of the internal electrodes 121 and 122 may be measured by scanning the cross-sections of the body 110 in the first direction and the second direction with a scanning electron microscope (SEM) with a magnification of 10,000. More specifically, the average value may be measured by measuring the thicknesses at a plurality of points of one of the internal electrode 121 and 122, that is, for example, at 30 points spaced apart by an equal distance in the second direction. The 30 points spaced apart by an equal distance may be designated in the capacitance forming portions Ac1 and Ac2. Also, the average thickness of the internal electrodes 121 and 122 may be further generalized by extending the measurement of the average value to ten internal electrodes 121 and 122.

The body 110 may include cover portions 113 and 114 disposed on the internal electrodes 121 and 122 disposed in an outermost region with respect to the first direction. For example, the cover portions 113 and 114 may include a first cover portion 113 disposed on uppermost internal electrodes 121 and 122 in the first direction and a second cover portion 114 disposed on lowermost internal electrodes 121 and 122, and the cover portions 113 and 114 may prevent damages to the internal electrode due to physical or chemical stress. The cover portions 113 and 114 may be configured the same as the first dielectric layer 111 other than the configuration in which the cover portions 113 and 114 may not include internal electrodes, or may be configured the same as the second dielectric layer 112.

The average thickness t2 of the cover portions 113 and 114 may not be limited to any particular example. However, the average thickness t2 of the cover portions 113 and 114 may be 20 μm or less to reduce the size and to obtain high capacitance of the multilayer electronic component 100. As described above, even when the average thickness t2 of the cover portions 113 and 114 is 20 μm or less, by disposing the intermediate layer 140 between the capacitance forming portions Ac1 and Ac2, cracks may be prevented and reliability may be improved. Here, the average thickness t2 of the cover portions 113 and 114 may refer to the average thickness of each of the first cover portion 113 and the second cover portion 114.

The average thickness t2 of the cover portions 113 and 114 may refer to the average size of the cover portions 113 and 114 in the first direction, and may be an average value of thicknesses of five points of the cross-section of the body 110 in the first and second directions, spaced apart by an equal distance.

The capacitor forming portions Ac1 and Ac2 may include margin portions 115 and 116 disposed on both end surfaces of the first dielectric layer 111 and the internal electrodes 121 and 122 in the third direction. That is, the margin portions 115 and 116 may refer to a region between both ends of the internal electrodes 121 and 122 and the boundary surface of the body 110 in a cross-section of the body 110, obtained by cutting in the first direction and the third direction. In this case, the margin portions 115 and 116 may include a first margin 115 connected to the fifth surface 5 of the body 110 and a second margin 116 connected to the sixth surface 6 of the body 110.

The margin portions 115 and 116 may include the same material as that of the first dielectric layer 111 of the capacitor forming portions Ac1 and Ac2, other than the configuration in which the internal electrodes 121 and 122 are not included.

The margin portions 115 and 116 may prevent damages to the internal electrodes 121 and 122 due to physical or chemical stress.

The margin portions 115 and 116 may be formed by applying a conductive paste for an internal electrode on a region on the ceramic green sheet other than a region in which the margin portion is to be formed and firing the paste.

The average thickness of the margin portions 115 and 116 may not be limited to any particular example. However, the average thickness of the margin portions 115 and 116 may be 20 μm or less to reduce the size and to increase capacitance of the multilayer electronic component 100. As described above, even when the average thickness of the margin portions 115 and 116 is 20 μm or less, by disposing the intermediate layer 140 between the capacitance forming portions Ac1 and Ac2, cracks may be prevented and reliability may improve. Here, the average thickness of the margin portions 115 and 116 may refer to the average thickness of each of the first margin portion 115 and the second margin portion 116.

The average thickness of the margin portions 115 and 116 may refer to an average size of the margin portions 115 and 116 in the third direction, and may be an average value of thicknesses of five points of the cross-section of the body 110 in the first and second directions, spaced apart by an equal distance.

The external electrodes 131 and 132 may be disposed on the third and fourth surfaces 3 and 4 of the body 110 and may extend to a portion of each of the first, second, fifth and sixth surfaces 1, 2, 5, and 6. The external electrodes 131 and 132 may include a first external electrode 131 and a second external electrode 132 connected to the plurality of first internal electrodes 121 and the plurality of second internal electrodes 122, respectively.

The external electrodes 131 and 132 may be formed of any material having electrical conductivity, such as a metal, and a specific material may be determined in consideration of electrical properties, structural stability, and the like, and the external electrodes 131 and 132 may have a multilayer structure. For example, the external electrodes 131 and 132 may include a conductive metal, and the conductive metal included in the external electrodes 131 and 132 may include copper (Cu), nickel (Ni), palladium (Pd), platinum (Pt), gold (Au), silver (Ag), lead (Pb), and/or alloys thereof.

The external electrodes 131 and 132 may include first electrode layers 131a and 132a disposed on the third and fourth surfaces 3 and 4 of the body 110 and connected to the internal electrodes 121 and 122, and second electrode layers 132a and 132b disposed on the first electrode layers 131a and 132a.

The first electrode layers 131a and 132a may be formed by dipping the third and fourth surfaces 3 and 4 of the body 110 in a conductive paste for an external electrode including a conductive metal and glass and firing the conductive paste. Alternatively, first electrode layers 131a and 132a may be formed by transferring a sheet including a conductive metal and glass. Accordingly, the first electrode layers 131a and 132a may be fired electrodes including a conductive metal and glass.

Also, the first electrode layers 131a and 131b may be, for example, resin-based electrodes including a conductive metal and resin. The first electrode layers 131a and 131b may be formed by applying and curing a paste including a conductive metal and resin.

The conductive metal included in the first electrode layers 131a and 132a may include copper (Cu), nickel (Ni), palladium (Pd), platinum (Pt), gold (Au), silver (Ag), lead (Pb) and/or alloys including the same, but an example embodiment thereof is not limited thereto.

The second electrode layers 131b and 132b may improve mounting properties. The type of the second electrode layers 131b and 132b is not limited to any particular example, and may be a plating layer including nickel (Ni), tin (Sn), palladium (Pd) and/or an alloy including the same, or may include a plurality of layers. The second electrode layers 131b and 132b may be, for example, a nickel (Ni) plating layer or a tin (Sn) plating layer, or a nickel (Ni) plating layer and a tin (Sn) plating layer may be sequentially formed. Also, the second electrode layers 131b and 132b may include a plurality of nickel (Ni) plating layers and/or a plurality of tin (Sn) plating layers.

In the drawings, the multilayer electronic component 100 may have two external electrodes 131 and 132, but an example embodiment thereof is not limited thereto, and the number and shape of the external electrodes 131 and 132 may be varied depending on the shape of the internal electrodes 121 and 122 or other purposes.

The multilayer electronic component 100 in an example embodiment may include the intermediate layer 140 disposed between the plurality of capacitance forming portions Ac1 and Ac2, including the second dielectric layer 112 and connected to the third to sixth surfaces 3, 4, 5, and 6 of the body 110, and the second dielectric layer 112 may include graphene.

Figure 17:
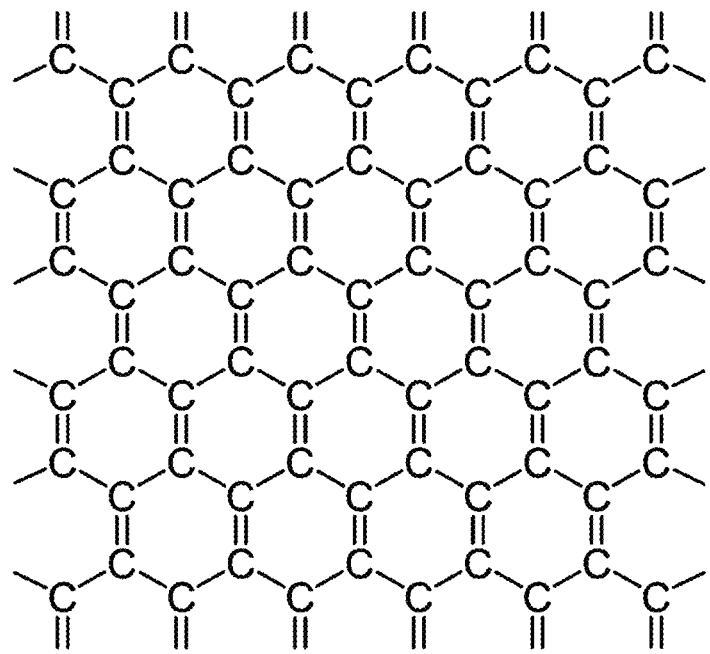
FIG. 17 is a structural formula of graphene.

FIG. 17 is a structural formula of graphene.

Referring to FIG. 17, graphene may include carbon atoms and may have a form of a thin film having a thickness of one atom. That is, graphene may have a two-dimensional plate-shaped structure. Graphene may have a thickness of about 0.2 nm and may have high physical and chemical stability, may have 100 times greater conductivity than that of copper, and may have mechanical strength 200 times stronger than that of steel.

Accordingly, since the second dielectric layer 112 includes graphene, the intermediate layer 140 may have higher strength and fracture toughness than those of the first dielectric layer 111, and accordingly, electrostrain cracks due to stress generated when voltage is applied to the multilayer electronic component 100 may be prevented.

Also, since the second dielectric layer 112 includes graphene, the intermediate layer 140 may have high strength and fracture toughness even though the intermediate layer 140 has a thickness smaller than a general ceramic layer for a buffer, such that the thickness of the intermediate layer 140 may be further reduced than a general ceramic layer. Accordingly, a decrease in capacitance of the multilayer electronic component 100 due to the intermediate layer 140 may be reduced.

Also, differently from the example in which graphene is included in the cover portions 113 and 114, the margin portions 115 and 116, or the side margin portions M1 and M2 to be described later which form an exterior of the multilayer electronic component, the intermediate layer 140 may be disposed between the capacitance forming portions Ac1 and Ac2 adjacent to each other, that is, in the body 110, thereby preventing graphene from being oxidized, burned, and destroyed even in a high-temperature environment. Accordingly, strength and reliability of the multilayer electronic component may effectively improve.

The second dielectric layer 112 may be formed by firing a ceramic green sheet to which a barium titanate ($BaTiO_3$)-based main component and graphene are added. The ceramic green sheet including graphene may be formed by preparing a ceramic slurry including, for example, ceramic powder, an organic solvent, an additive including graphene, and a binder, applying the slurry to a carrier film and drying the slurry. Alternatively, graphene may be mixed with the binder, and the graphene may be pre-dispersed in the binder by ball-milling, and ceramic slurry may be prepared by mixing the binder in which the graphene is dispersed, ceramic powder, an organic solvent, and an additive, and a ceramic green sheet may be formed using the slurry. However, an example embodiment thereof is not limited thereto, and for example, the ceramic green sheet may be formed using a ceramic powder mixed with graphene powder. The second dielectric layer 112 may be configured the same as the first dielectric layer 111 other than the configuration in which the second dielectric layer 112 may include graphene, but an example embodiment thereof is not limited thereto.

The intermediate layer 140 may be formed by laminating one or more ceramic green sheets to which graphene is added and firing the sheets. That is, by including a process of laminating one or more ceramic green sheets including separately manufactured graphene in the process of laminating the ceramic green sheets coated with the conductive paste for an internal electrode, the intermediate layer 140 disposed between the capacitor forming portions Ac1 and Ac2 adjacent to each other and including the second dielectric layer 112 may be formed.

More specifically, the second cover portion 114 may be laminated by laminating one or more ceramic green sheets, the second capacitor forming portion Ac2 may be laminated by laminating a plurality of ceramic green sheets coated with a conductive paste for an internal electrode, and the intermediate layer 140 may be laminated by laminating one or more ceramic green sheets including graphene. Thereafter, the second capacitance forming portion Ac1 may be laminated by laminating a plurality of ceramic green sheets coated with conductive paste for an internal electrode, and the first cover portion 113 may be laminated by laminating ceramic green sheets, thereby preparing a laminate. In this case, a conductive paste for an internal electrode may be applied to the ceramic green sheet laminated on the uppermost ceramic green sheet including graphene with respect to the first direction. Accordingly, the intermediate layer 140 including the second dielectric layer may be formed between the internal electrode disposed in the lowermost portion of the first capacitor forming portion Ac1 and the internal electrode disposed in the uppermost portion of the second capacitor forming portion Ac2.

However, an example embodiment thereof is not limited thereto, and to simplify the manufacturing process, the ceramic green sheet laminated on the uppermost portion in the first direction among the plurality of ceramic green sheets forming the intermediate layer 140 may not include graphene, and may be a ceramic green sheet coated with a conductive paste for an internal electrode. Accordingly, the intermediate layer 140 may include a single first dielectric layer 111.

In an example embodiment, the first dielectric layer 111 may not include graphene or may include graphene in a content lower than the content of graphene included in the second dielectric layer 112.

Graphene may have several advantages, but when graphene is included in the first dielectric layer 111 directly related to electrical properties of the multilayer electronic component 100, a particle size of grains of the first dielectric layer may become non-uniform or sintering driving may be prevented, such that strength of the multilayer electronic component 100 may not be uniform.

Also, when graphene is included in the first dielectric layer 111, a dielectric constant may improve, which may be advantageous, but it may be difficult to control positions of the entirety of graphene due to low dispersibility of graphene. Accordingly, moisture resistance reliability or breakdown voltage of the multilayer electronic component 100 may be deteriorated.

Accordingly, in the multilayer electronic component in an example embodiment, the first dielectric layer 111 may not include graphene, or may include graphene in a content less than that of graphene included in the second dielectric layer 112, such that deterioration of moisture resistance reliability and breakdown voltage may be prevented.

That is, to prevent deterioration of moisture resistance reliability and breakdown voltage, the first dielectric layer 111 may not preferably include graphene, but an example embodiment thereof is not limited thereto, and the first dielectric layer 111 may include graphene in a content lower than the content of graphene included in the second dielectric layer 112 to improve a dielectric constant of the first dielectric layer 111.

Meanwhile, the content of graphene included in the second dielectric layer 112 may be determined in consideration of target strength, a size of the multilayer electronic component, and the number of laminates, and is not limited to any particular example.

However, the content of graphene included in the second dielectric layer 112 may be 0.1 portion by weight to 1.0 portion by weight as compared to 100 portions by weight of the barium titanate ($BaTiO_3$)-based main component included in the second dielectric layer 112.

When the content of graphene included in the second dielectric layer 112 is less than 0.1 portion by weight based on 100 portions by weight of the main component, the effect of increasing strength of the multilayer electronic component may be insufficient, and when the content exceeds 1.0 portion by weight based on 100 portions by weight of the main component, dispersibility of graphene may deteriorate and viscosity may increase, such that it may be difficult to uniformly distribute graphene.

When the first dielectric layer 111 includes graphene, the content of graphene included in the first dielectric layer 111 may be lower than the content of graphene included in the second dielectric layer 112, and it may not be necessary to limit the content. For example, the content of graphene included in the first dielectric layer 111 may be less than 1.0 portion by weight based on 100 portions by weight of the main component.

The length of graphene included in the second dielectric layer 112 may be determined in consideration of a target strength, an average particle size of the grains of the second dielectric layer 112, and the like, and is not limited to any particular example.

However, the graphene included in the second dielectric layer 112 may have a long axis (or a major axis) of 0.3 μm to 10 μm. When the above range is satisfied, the graphene may cover the plurality of grains included in the second dielectric layer 112 to an appropriate level. Accordingly, electrostrain cracks formed in the multilayer electronic component may be prevented and strength and reliability of the multilayer electronic component may effectively improve.

The type of graphene included in the second dielectric layer 112 may not be limited to any particular example. That is, the graphene may include various types of graphene. For example, the graphene may include various types of graphene such as few layer graphene, nanosized graphene plate, and graphene nanoribbon.

Also, the graphene may include graphene formed by various processes such as graphene flake formed by the ball-milling process and CVD graphene formed by chemical vapor deposition (CVD).

Also, the graphene may include pure graphene including 99 at % or more of carbon atoms, graphene oxide (GO) including 1 at % or more and 20 at % or less of oxygen atoms, and reduced graphene oxide (RGO), but an example embodiment thereof is not limited thereto, and graphene including various non-carbon atoms such as hydrogen (H), nitrogen (N), boron (B), fluorine (F), chlorine (Cl), bromine (Br) and iodine (I).

In an example embodiment, the average thickness t1 of the intermediate layer 140 may be smaller than the average thickness t2 of the cover portions 114 and 115, and may be greater than the average thickness t3 of the first dielectric layer 111 (t3<t1<t2). By satisfying the above conditions, capacitance of the multilayer electronic component may not be deteriorated and strength of the multilayer electronic component may effectively improve.

When the average thickness t1 of the intermediate layer 140 is greater than the average thickness t2 of the cover portions 114 and 115, capacitance of the multilayer electronic component may be excessively reduced. Also, when the average thickness t1 of the intermediate layer 140 is smaller than the average thickness t3 of the first dielectric layer 111, the effect of improvement of strength of the multilayer electronic component may be insignificant.

To prevent an excessive decrease of capacitance of the multilayer electronic component, a ratio (t1/t2) of the average thickness t1 of the intermediate layer 140 to the average thickness t2 of the cover portions 114 and 115 may be, for example, 0.8 or less. A lower limit of the t1/t2 ratio is not limited to any particular example, but may be, for example, 0.01 or more.

Also, to effectively improve strength of the multilayer electronic component, a ratio (t1/t3) of the average thickness t1 of the intermediate layer 140 to the average thickness t3 of the first dielectric layer 111 may be, for example, 7 or more. The upper limit of the t1/t3 ratio is not limited to any particular example, but may be, for example, 100 or less.

The average thickness t1 of the intermediate layer 140 may refer to an average size of the intermediate layer 140 in the first direction. The thickness of the intermediate layer 140 may refer to a distance in the first direction between the intermediate layer 140 and the two closest internal electrodes 121 and 122. Also, the average thickness t1 of the intermediate layer 140 may be an average value of thicknesses of five points of the cross-section of the body 110 in the first and second directions, spaced apart by an equal distance. Meanwhile, when a plurality of intermediate layers 140 are disposed, the average thickness t1 may refer to an average thickness of each of the plurality of intermediate layers 140.

Figure 5:
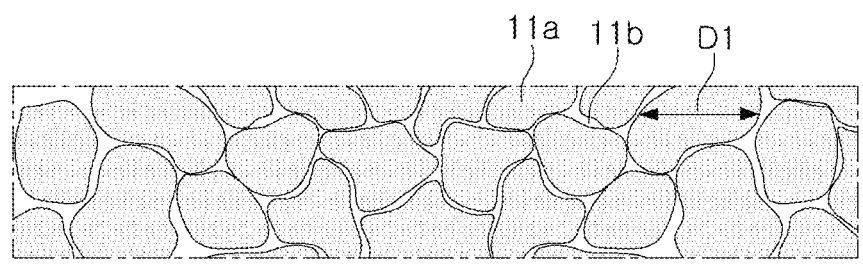
FIG. 5 is a diagram illustrating region K1 illustrated in FIG. 2.
Figure 6:
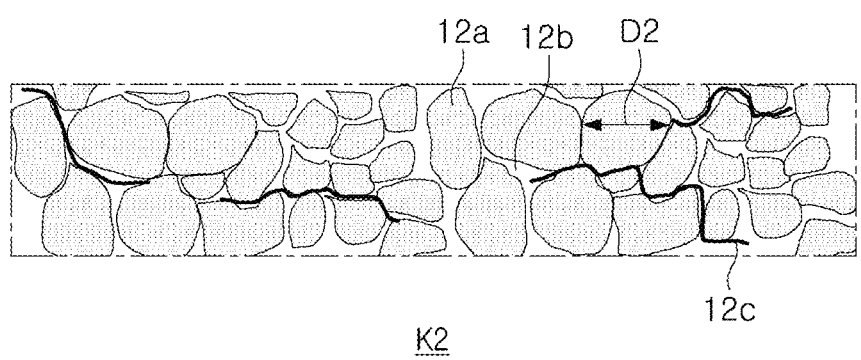
FIG. 6 is a diagram illustrating region K2 illustrated in FIG. 2.

FIG. 5 is a diagram illustrating region K1 illustrated in FIG. 2. FIG. 6 is a diagram illustrating region K2 illustrated in FIG. 2.

In an example embodiment, the first dielectric layer 111 may include a plurality of grains 11a and grain boundaries 11b formed between grains adjacent to each other, the second dielectric layer 112 may include a plurality of grains 12a and grain boundaries 12b formed between grains adjacent to each other and the graphene 12c included in the second dielectric layer 112 may be disposed at the grain boundary 12b of the second dielectric layer 112. Also, at least one of the plurality of graphene 12c included in the second dielectric layer 112 may have one surface disposed along surfaces of at least two or more grains 12a among the plurality of grains 12a included in the second dielectric layer 112.

The graphene 12c included in the second dielectric layer 112 may be disposed at the grain boundary 12b of the second dielectric layer 112, and may be disposed along the surfaces of at least two or more grains 12a among the plurality of grains 12a included in the second dielectric layer 112, such that the graphene 12c may cover the plurality of crystal grains 12a included in the second dielectric layer 112 to an appropriate level.

Accordingly, electrostrain cracks may be prevented by effectively dispersing stress applied to the multilayer electronic component, and strength and reliability of the multilayer electronic component may effectively improve.

In an example embodiment, the average particle size D2 of the grains 12a of the second dielectric layer 112 may be smaller than the average particle size D1 of the grains 11a of the first dielectric layer (D2<D1). Also, the average particle size D1 of the first dielectric layer 111 and the average particle size D2 of the second dielectric layer 112 may satisfy 0<(D1−D2)/D1≤0.3.

The difference in the average particle sizes of grains may be due to the graphene 12c included in the second dielectric layer 112, and the second dielectric layer 112 may have an average particle size smaller than a particle size of the first dielectric layer 111, such that the second dielectric layer 112 may have high toughness, thereby effectively preventing electrostrain cracks and improving strength and reliability of the multilayer electronic component.

As for the average particle size D1 of the grains 11a of the first dielectric layer 111 and the average particle size D2 of the grains 12a of the second dielectric layer 112, when a linear line is drawn from one point to another point of the grain boundary of a grain, the line having the highest value may be a major axis, and the line having the highest value among the linear lines orthogonal to the major axis may be the minor axis, and the average value of the major axis and the minor axis may be a size of the grain. Also, the average value of sizes of 500 or more grains may be the average particle size of the grain.

Also, the average particle sizes D1 and D2 of the grains 11a and 12a may be measured from the image obtained by scanning the cross-section of the body 110 in the first direction and the third direction using a scanning electron microscope (SEM). In this case, the magnification may be varied depending on the size of the grains, and the magnification may be adjusted such that the size of 500 or more grains may be measured. However, it may not be necessary to adjust the magnification such that more than 500 grains are included in an image, and the magnification may be adjusted such that that the total number of grains included in the plurality of images may be 500 or more.

In an example embodiment, a peak in a D-band and a G-band may be detected in the second dielectric layer 112 in Raman analysis of the second dielectric layer 112. More specifically, intensity of peaks detected in the G band in Raman analysis of the second dielectric layer 112 may be higher than intensity of peaks detected in the D band. Also, a peak in a 2D band may be detected in the second dielectric layer 112 in Raman analysis of the second dielectric layer 112.

Here, the D band may be detected in 1300-1400 $cm^{-1}$ in the Raman spectrum analysis, the G band may be detected in 1500-1600 $cm^{-1}$ in the Raman spectrum analysis, and the 2D band may be detected in 2600-2800 $cm^{-1}$ in Raman spectral analysis.

The peak appearing in the G band may represent a peak commonly found in graphite-based materials, and the peak appearing in the D band may represent a peak due to defects in the crystal. The higher the intensity of the peak appearing in the D band, the more defects may be present in the graphene. The 2D band may appear when inelastic scattering by phonons having an energy of 1300 to 1400 $cm^{-1}$ occurs twice in succession. In particular, various scattering may occur in the graphene having a multilayer structure, such that intensity of the peak detected in the 2D band may increase. That is, the higher the intensity of the peak appearing in the 2D band, the higher the number of graphene layers may be.

In general, peaks in the D band and G band may be detected due to $sp^3$ defects present at the edge of graphene, and in graphite, which is another carbon allotrope of graphene, a peak may be detected only in the G band and no peak may be detected in the D band.

Accordingly, the presence or absence of graphene and other carbon allotropes may be identified by the Raman analysis method, and the peaks detected in the G band and the D band during the Raman analysis of the second dielectric layer 112 may indicate that graphene is included in the second dielectric layer 112.

In an example embodiment, in the first dielectric layer 111, no peaks may be simultaneously detected in the D-band and the G-band in Raman analysis, or peaks in the D band and G band having intensity lower than that of the peaks in the D-band and the G-band detected in the second dielectric layer 112 may be detected.

The notion that peaks are not simultaneously detected in the D band and the G band in Raman analysis of the first dielectric layer 111 may indicate that the first dielectric layer 111 does not include graphene.

Also, the notion that, in the Raman analysis of the first dielectric layer 111, the peaks in the D band and the G band having lower intensity than that of the peaks in the D band and the G band detected in the second dielectric layer 112 are detected may indicate that the first dielectric layer 111 may include graphene in a content lower than the content of graphene included in the second dielectric layer 112.

As described above, when graphene is directly included in the first dielectric layer 111, strength of the multilayer electronic component may be non-uniform, and moisture resistance reliability or breakdown voltage may deteriorate.

Accordingly, it may be preferable that peaks are not simultaneously detected in the D band and the G band in Raman analysis of the first dielectric layer 111, but an example embodiment thereof is not limited thereto, and when the first dielectric layer 111 include graphene in a content lower than the content of graphene included in the second dielectric layer 112, peaks in the D and G bands having lower intensity than that of the peaks in the D and G bands detected in the second dielectric layer 112 may be detected in Raman analysis of the first dielectric layer 111.

In an example embodiment, in the second dielectric layer 112, the ratio of intensity of the peak detected in the D band to intensity of the peak detected in the G band may be 0.03 to 0.5.

In this case, the ratio of intensity of the peak detected in the D band to intensity of the peak detected in the G band may indicate the quality of graphene, and the lower the ratio, the fewer defects in the graphene, and the higher the ratio, the more defects in graphene.

The second dielectric layer 112 may include graphene having few defects satisfying the above ratio, such as, for example, graphene in which a ratio of carbon atom is 90 at % or more, thereby improving strength and reliability of the multilayer electronic component. When the graphene included in the second dielectric layer 112 exceeds the above ratio, the graphene may be oxidized, burned, and destroyed in a high-temperature environment.

Figure 7:
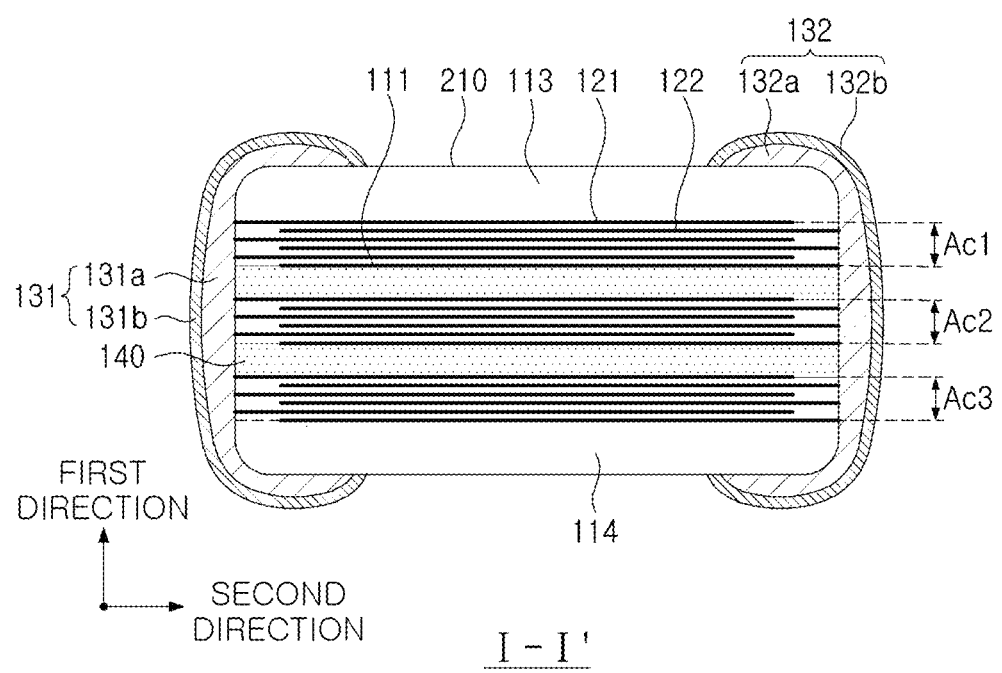
FIG. 7 is a diagram illustrating a modified example of the example in FIG. 2.

FIG. 7 is a diagram illustrating a modified example of the example in FIG. 2.

Referring to FIG. 7, the body 210 of the multilayer electronic component 200 in an example embodiment may include a plurality of intermediate layers 140, and the plurality of intermediate layers 140 may be spaced apart from each other.

FIG. 7 illustrates a body 210 including two intermediate layers 140 disposed between three capacitive forming portions Ac1, Ac2, and Ac3 and capacitance forming portions Ac1, Ac2, and Ac3 adjacent to each other, but an example embodiment thereof is not limited thereto. For example, the body 210 may include three or more intermediate layers 140 spaced apart from each other, and the upper limit of the number of the intermediate layers 140 is limited to any particular example. For example, the number of the intermediate layers 140 may be 10 or less.

In the multilayer electronic component 200 in an example embodiment, a plurality of intermediate layers 140 may be disposed, such that the intermediate layer 140 may be disposed in each region in which strength is weak in the body 210. Accordingly, strength and reliability of the multilayer electronic component may effectively improve.

Figure 8:
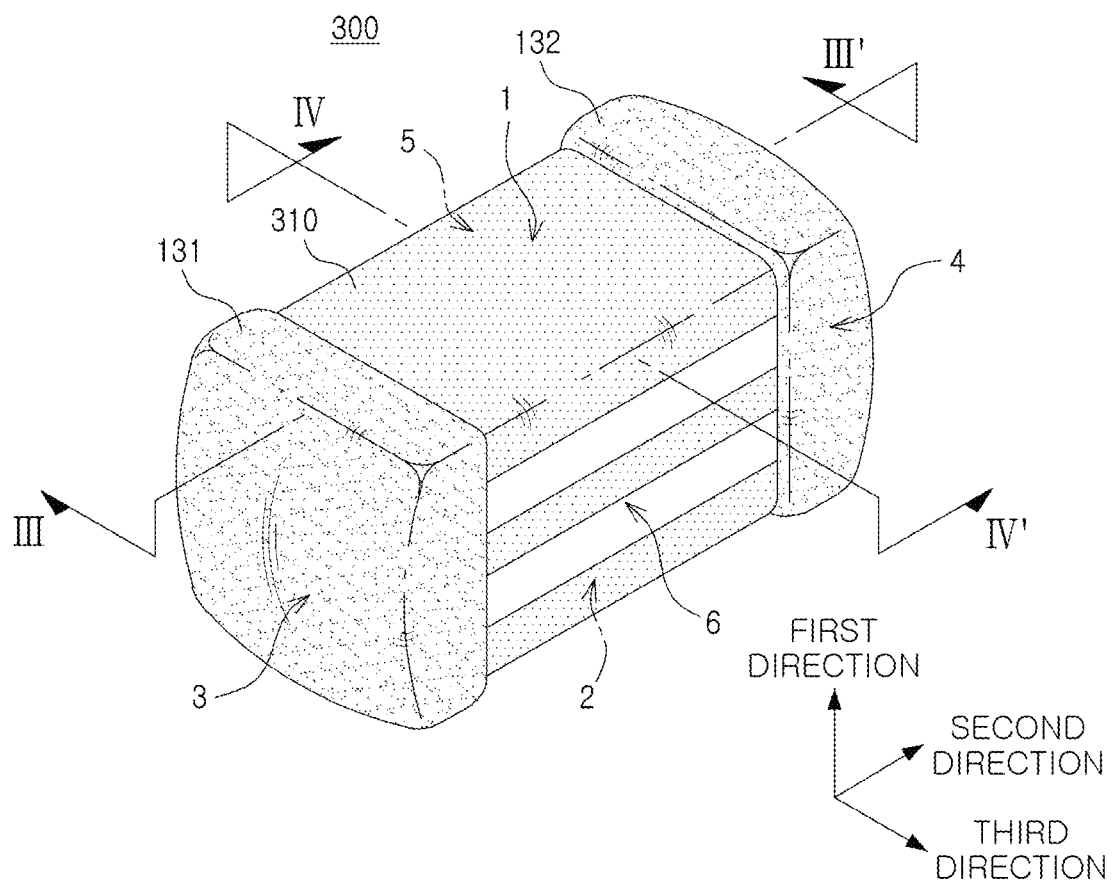
FIG. 8 is a perspective diagram illustrating a multilayer electronic component according to an example embodiment in the present disclosure.
Figure 9:
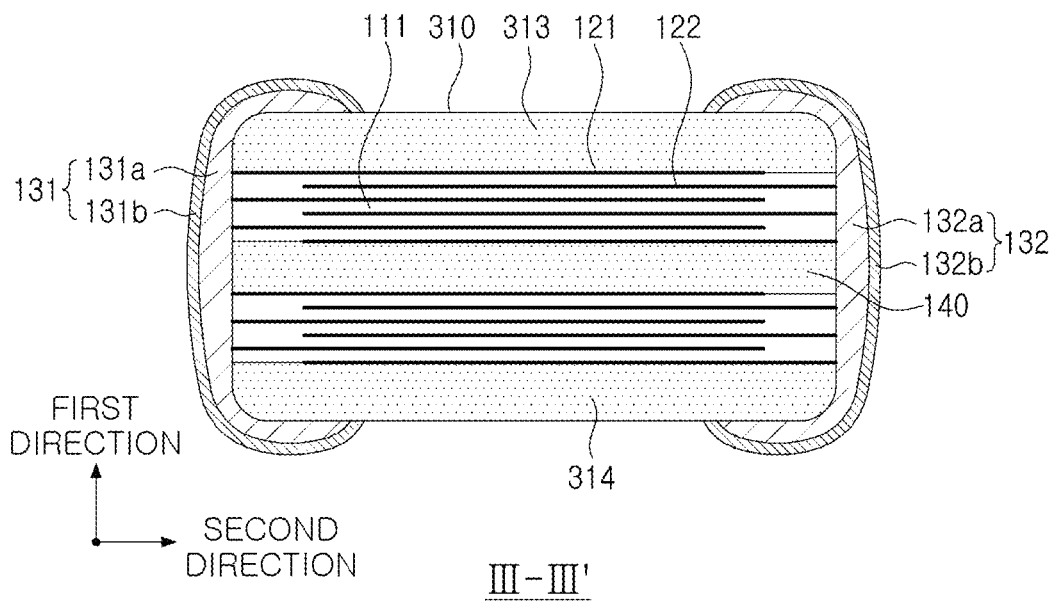
FIG. 9 is a cross-sectional diagram taken along line III-III' in FIG. 8.
Figure 10:
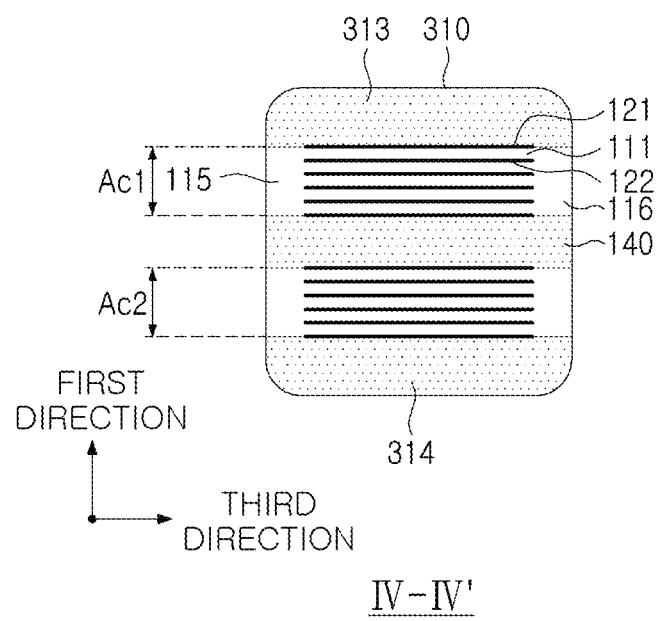
FIG. 10 is a cross-sectional diagram taken along line IV-IV' in FIG. 8.

FIG. 8 is a perspective diagram illustrating a multilayer electronic component according to an example embodiment. FIG. 9 is a cross-sectional diagram taken along line III-III' in FIG. 8. FIG. 10 is a cross-sectional diagram taken along line IV-IV' in FIG. 8.

Referring to FIGS. 8 to 10, the body 310 of the multilayer electronic component 300 in an example embodiment may include cover portions 313 and 314 disposed on the internal electrodes 121 and 122 disposed in an outermost region with respect to the first direction, and the cover portions 313 and 314 may include graphene. Since the cover portions 313 and 314 forming an exterior of the multilayer electronic component 300 include graphene, stress applied to the multilayer electronic component in the first direction may be effectively dispersed such that strength and reliability of the multilayer electronic component may effectively increase.

The cover portions 313 and 314 may be formed by, for example, laminating a plurality of second dielectric layers 112 on the internal electrodes 121 and 122 disposed in an outermost region with respect to the first direction. However, an example embodiment thereof is not limited thereto.

In an example embodiment, peaks in a D band and a G band may be detected in the cover portions 313 and 314 in Raman analysis of the cover portions 313 and 314.

As described above, the peaks detected in the G band and the D band in Raman analysis of the cover portions 313 and 314 may indicate that graphene may be included in the cover portions 313 and 314.

Figure 11:
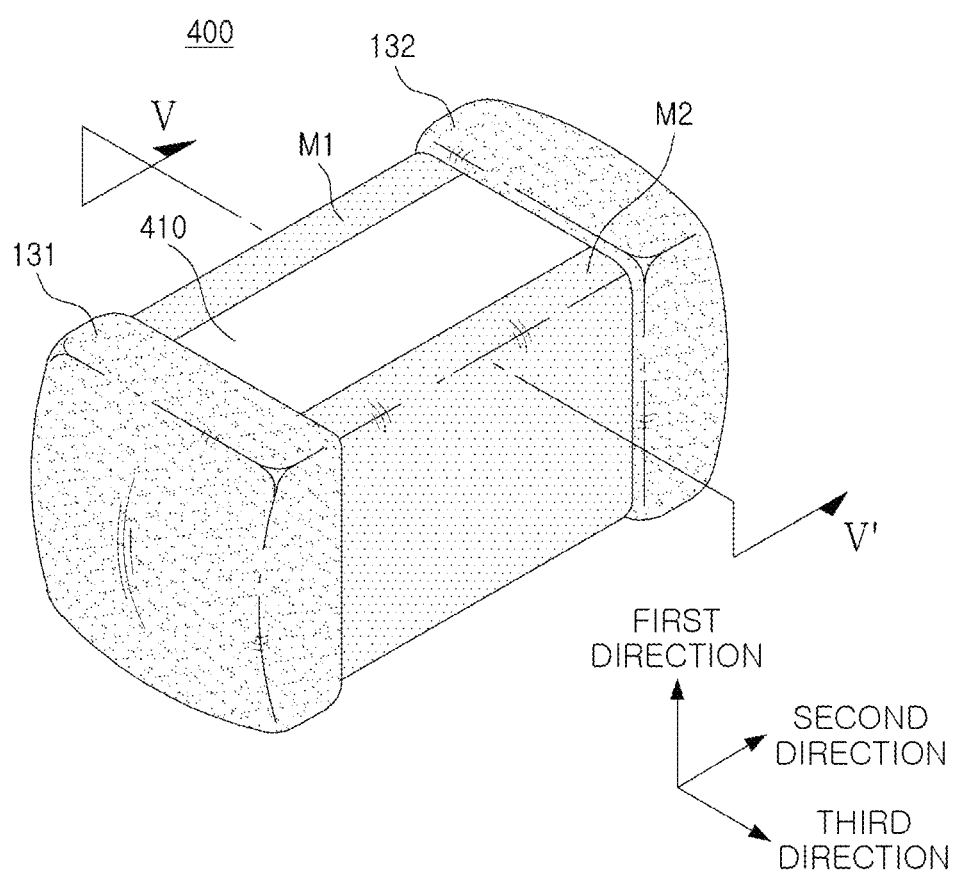
FIG. 11 is a perspective diagram illustrating a multilayer electronic component according to an example embodiment in the present disclosure.
Figure 12:
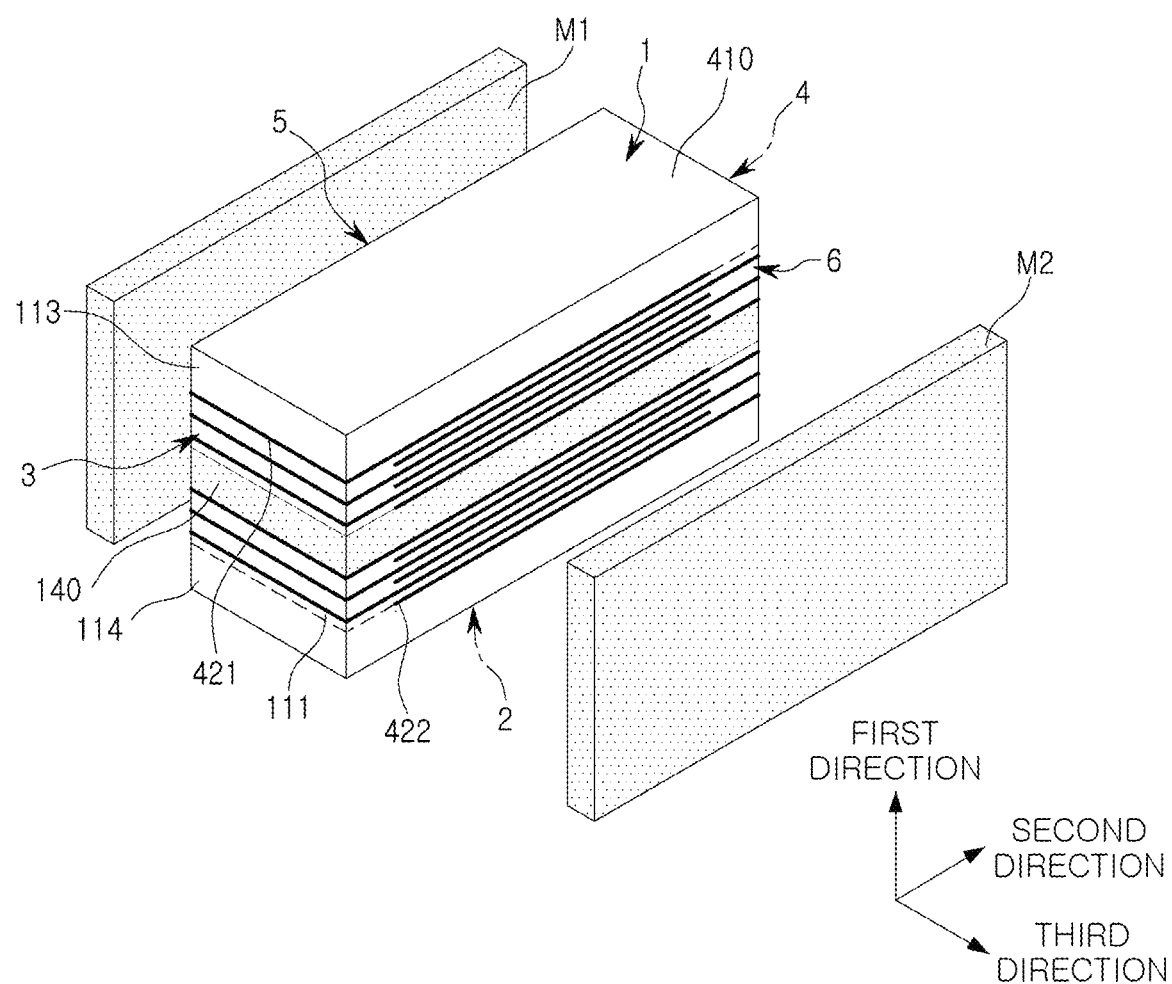
FIG. 12 is an exploded perspective diagram illustrating a body and a side margin portion illustrated in FIG. 11 according to an example embodiment in the present disclosure.
Figure 13:
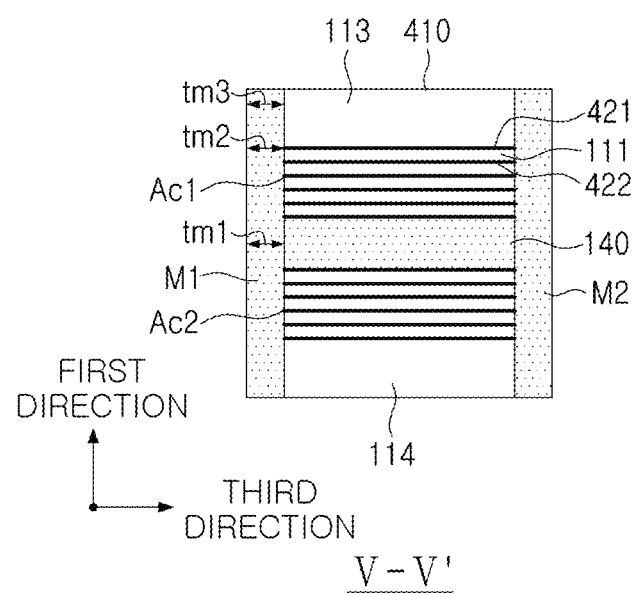
FIG. 13 is a cross-sectional diagram taken along line V-V' in FIG. 11.

FIG. 11 is a perspective diagram illustrating a multilayer electronic component 400 according to an example embodiment. FIG. 12 is an exploded perspective diagram illustrating a body and a side margin portion illustrated in FIG. 11 according to an example embodiment. FIG. 13 is a cross-sectional diagram taken along line V-V' in FIG. 11.

The body 410 of the multilayer electronic component 400 in an example embodiment may be disposed to be connected to the fifth and sixth surfaces 5 and 6 of the body 410, and may include internal electrodes 421 and 422 disposed to be connected to the fourth surfaces 3 and 4.

More specifically, the internal electrodes 421 and 422 may include the first internal electrode 421 disposed to be connected to the third surface, the fifth surface, and the sixth surface 3, 5, and 6 of the body 410, and spaced apart from the fourth surface 4 and the second internal electrode 422 disposed to be connected to the fourth to sixth surfaces 4, 5, and 6 of the body 410 and spaced apart from the third surface 3.

The multilayer electronic component 400 in an example embodiment may include side margin portions M1 and M2 disposed on the fifth and sixth surfaces 5 and 6 of the body 410. More specifically, the side margin portions M1 and M2 may include a first side margin portion M1 disposed on the fifth surface 5 of the body 410 and a second side margin portion M2 disposed on the sixth surface 6 of the body 410.

That is, the internal electrodes 421 and 422 may be connected to the side margin portions M1 and M2 on the fifth and sixth surfaces 5 and 6 of the body 410, and the intermediate layer 140 connected to the third to sixth surfaces 3, 4, 5, and 6 of the body 410 may be connected to the side margin portions M1 and M2 on the fifth and sixth surfaces 5 and 6 of the body 410.

To prevent the step difference caused by the internal electrodes 421 and 422, the side margin portions M1 and M2 may be formed by cutting the internal electrodes 421 and 422 to be connected to the fifth and sixth surfaces 5 and 6 of the body 410 after lamination, and laminating the first dielectric layer 111 or the second dielectric layer 112 on the fifth and sixth surfaces 5 and 6 of the body 410, but an example embodiment thereof is not limited thereto.

The average thickness of the side margin portions M1 and M2 may not be limited to any particular example. However, the average thickness of the side margin portions M1 and M2 may be 20 μm or less to reduce the size and to increase capacitance of the multilayer electronic component 400. Even when the average thickness of the side margin portions M1 and M2 is 20 μm or less, by disposing the intermediate layer 140 between the capacitance forming portions Ac1 and Ac2, cracks may be prevented and reliability of the multilayer electronic component may improve. The average thickness of the side margin portions M1 and M2 may refer to an average thickness of each of the first side margin portion and the second side margin portion.

The average thickness of the side margin portions M1 and M2 may refer to an average size of the side margin portions M1 and M2 in the third direction, and may be an average value of the sizes in the third direction measured at five points spaced apart by an equal distance in the cross-section of the multilayer electronic component 400 in the first direction and the third direction.

In an example embodiment, a ratio of a thickness tm2 of the first or second side margin region in contact with the ends of the internal electrodes 421 and 422 disposed in the outermost region in the first direction to a thickness tm1 of the first or second side margin region corresponding to the central region of the body 410 in the first direction may be 1.0 or less.

The lower limit of the ratio of a thickness tm2 of the first or second side margin region in contact with the ends of the internal electrodes 421 and 422 disposed in the outermost region in the first direction to a thickness tm1 of the first or second side margin region corresponding to the central region of the body 410 in the first direction may not be limited to any particular example, and may be 0.9 or more preferably.

Generally, since the side margin portion may be formed by coating or printing a ceramic slurry, a deviation of a thickness of each position of the side margin portion may increase. Specifically, generally, the thickness of the first or second side margin region corresponding to the central region in the first direction of the body may be greater than that of the other regions.

For example, generally, the ratio of the thickness of the first or second side margin region in contact with the end of the internal electrode disposed in the outermost region with respect to the first direction to the thickness of the first or second side margin region corresponding to the central region of the body in the first direction may be less than 0.9, and the deviation may be large.

As described above, when the deviation in the thickness of each position of the side margin portion is large as in the general case, the portion occupied by the side margin portion may be large in the same-size multilayer electronic component, such that the large size of the capacitance forming portion may not be secured and accordingly, it may be difficult to secure a high capacitance.

In an example embodiment, since the ratio of a thickness tm2 of the first or second side margin region in contact with the ends of the internal electrodes 421 and 422 disposed in the outermost region in the first direction to a thickness tm1 of the first or second side margin region corresponding to the central region of the body 410 in the first direction may 0.9 or more and 1.0 or less, by forming the first and second side margin portions M1 and M2 to have a small size in the first direction, the large size of the capacitance forming portions Ac1 and Ac2 may be secured.

The ratio of the thickness tm3 of the first or second side margin region in contact with the edge of the body 410 to the thickness tm1 of the first or second side margin region corresponding to the central region of the body 410 in the first direction may be 1.0 or less.

The lower limit of the ratio of the thickness tm3 of the first or second side margin region in contact with the edge of the body 410 to the thickness tm1 of the first or second side margin region corresponding to the central region of the body 410 in the first direction may not be limited to any particular example, and may be 0.9 or more preferably.

Due to the above properties, a large size of the capacitance forming portion may be secured as the deviation in thickness of the regions of the side margin portion is relatively small, thereby implementing a multilayer electronic component having high capacitance.

In an example embodiment, the side margin portions M1 and M2 may further include graphene. Since the side margin portions M1 and M2 included in the exterior of the multilayer electronic component 400 include graphene, stress applied to the multilayer electronic component in the third direction may be effectively dispersed such that strength and reliability of the multilayer electronic component may improve.

The side margin portions M1 and M2 may include graphene by laminating the second dielectric layer 112, but an example embodiment thereof is not limited thereto.

In an example embodiment, peaks in the D band and the G band may be detected in the side margin portions M1 and M2 in Raman analysis of the side margin portions M1 and M2.

As described above, the peaks detected in the G band and the D band in Raman analysis of the side margin portions M1 and M2 may indicate that graphene is included in the side margin portions M1 and M2.

Figure 14:
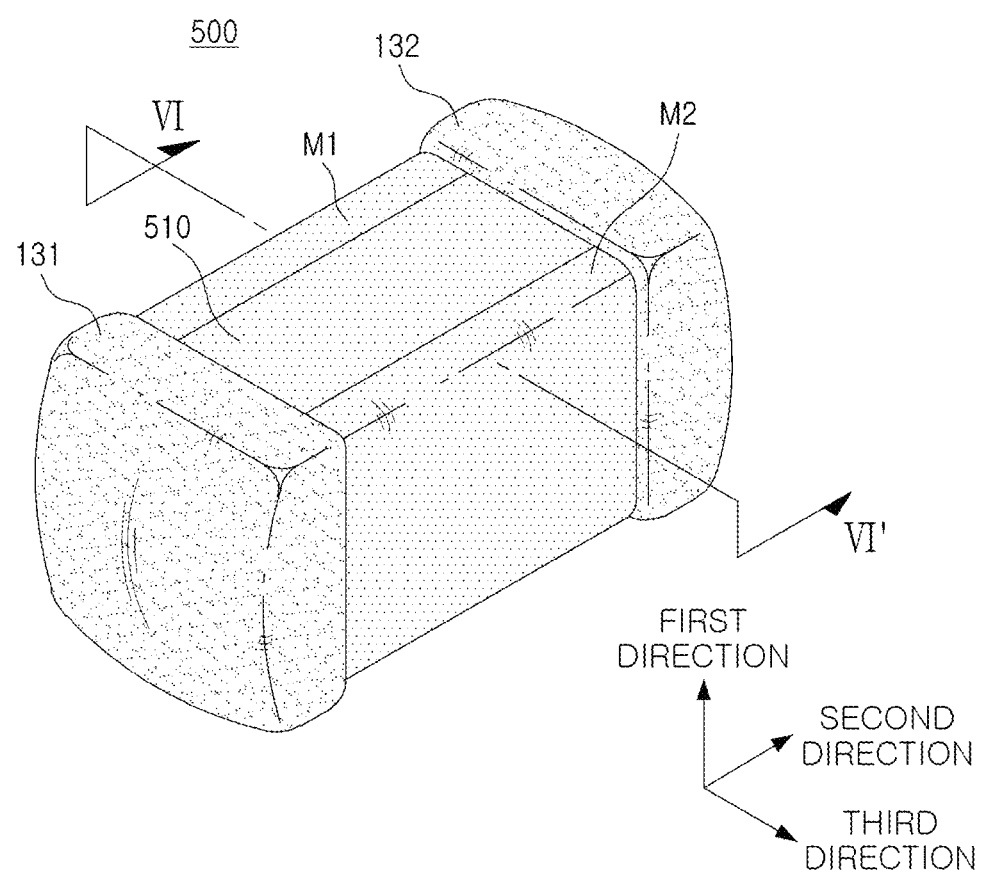
FIG. 14 is a diagram illustrating a modified example of the example in FIG. 11.
Figure 15:
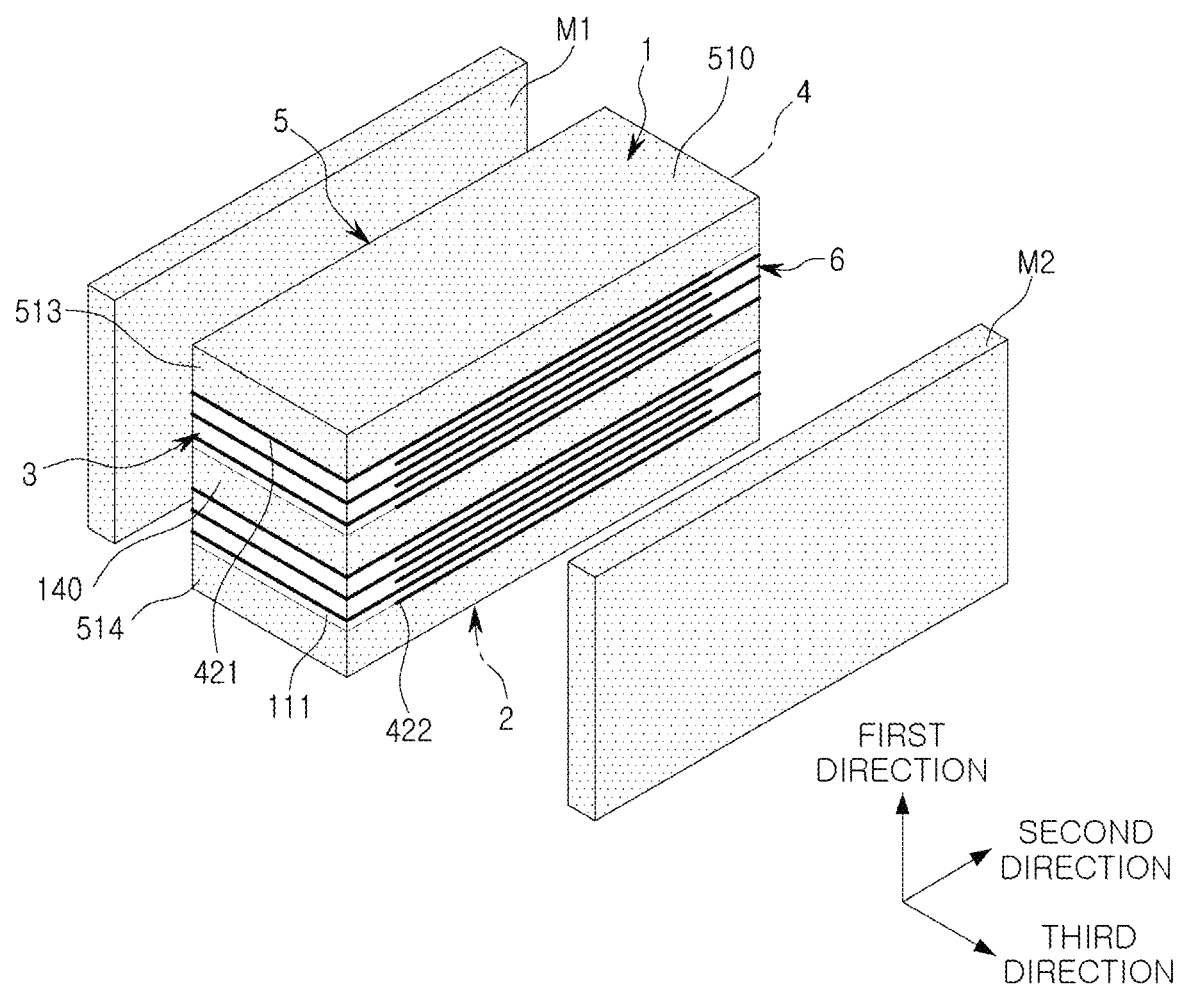
FIG. 15 is an exploded perspective diagram illustrating a body and a side margin portion illustrated in FIG. 11 according to an example embodiment in the present disclosure.
Figure 16:
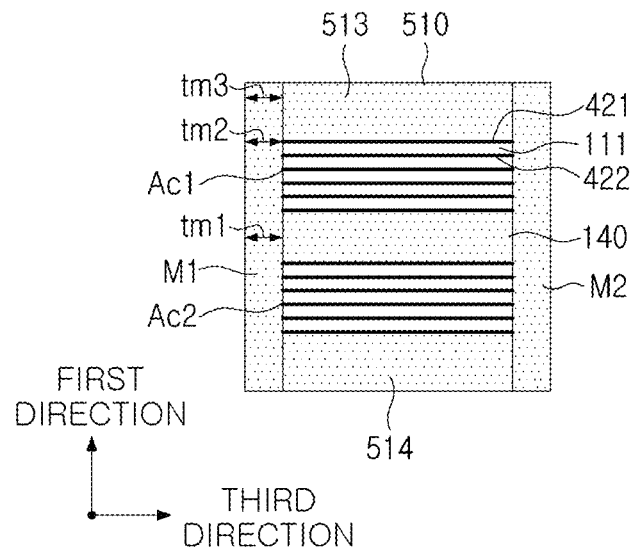
FIG. 16 is a cross-sectional diagram taken along line VI-VI' in FIG. 14.

FIG. 14 is a diagram illustrating a modified example of the example in FIG. 11. FIG. 15 is an exploded perspective diagram illustrating a body and a side margin portion illustrated in FIG. 11 according to an example embodiment. FIG. 16 is a cross-sectional diagram taken along line VI-VI' in FIG. 14.

As illustrated in FIGS. 14 to 16, the body 510 of the multilayer electronic component 500 in an example embodiment may include cover portions 513 and 514 including graphene.

Since the cover portions 513 and 514 and the side margin portions M1 and M2 forming an exterior of the multilayer electronic component 500 include graphene, stress applied to the multilayer electronic component in the first direction and the third direction may be effectively dispersed, such that strength and reliability of the multilayer electronic component may effectively improve.

In an example embodiment, peaks in the D band and the G band may be detected in the side margin portions M1 and M2 and the cover portions 513 and 514 in Raman analysis thereof.

As described above, the peaks in the G band and the D band detected in Raman analysis of the side margin portions M1 and M2 and the cover portions 513 and 514 may indicate that graphene is included in the side margin portions M1 and M2 and the cover portions 513 and 514.

Hereinafter, a multilayer electronic component in an example embodiment will be described in greater detail. However, the multilayer electronic component in an example embodiment may be configured the same as the above-described example embodiments. Accordingly, overlapping descriptions will not be provided.

Referring to FIGS. 1 to 4, the multilayer electronic component 100 in an example embodiment may include a plurality of capacitance forming portions Ac1 and Ac2 including a first dielectric layer 111 and internal electrodes 121 and 122 alternately disposed in a first direction, and an intermediate layer 140 disposed between capacitance forming portions Ac1 and Ac2 adjacent to each other and including a second dielectric layer 112, a body first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first to fourth surfaces 1 to 4 and opposing each other in a third direction, and external electrodes 131 and 132 disposed on the body 110 and connected to the internal electrodes, and the second dielectric layer may include graphene, and when an average thickness of the intermediate layer is defined as t1 and an average thickness of the first dielectric layer is defined as t3, t3<t1 may be satisfied.

As described above, since the second dielectric layer 112 includes graphene, the intermediate layer 140 may have higher strength and fracture toughness than those of the first dielectric layer 111, and the effect of improvement of such strength and fracture toughness may further increase by satisfying t3<t1. Accordingly, electrostrain cracks due to stress generated when a voltage is applied to the multilayer electronic component 100 may be prevented.

In an example embodiment, when the average thickness t2 of the cover portions 114 and 115 is defined as t2, t3<t1<t2 may be satisfied. As described above, when the average thickness t1 of the intermediate layer 140 is greater than the average thickness t2 of the cover portions 114 and 115, capacitance of the multilayer electronic component may be excessively reduced.

Referring to FIG. 7, in an example embodiment, the body 210 of the multilayer electronic component 220 may include a plurality of intermediate layers 140, and the plurality of intermediate layers 140 may be spaced apart from each other.

As described above, in the multilayer electronic component 200 in an example embodiment, the plurality of intermediate layers 140 may be disposed, such that the intermediate layer 140 may be disposed in each region of the body 210 in which strength is weak, and accordingly, strength and reliability of the multilayer electronic component may effectively improve.

Referring to FIGS. 8 to 10, in an example embodiment, the cover portions 313 and 314 may include graphene.

As described above, since the cover portions 313 and 314 forming an exterior of the multilayer electronic component 300 include graphene, stress applied to the multilayer electronic component in the first direction may be effectively dispersed, such that strength and reliability of the multilayer electronic component may effectively improve.

Referring to FIGS. 11 to 13, in an example embodiment, the side margin portions M1 and M2 may further include graphene. Since the side margin portions M1 and M2 included in the exterior of the multilayer electronic component 400 include graphene, stress applied to the multilayer electronic component in the third direction may be effectively dispersed such that strength and reliability of the multilayer electronic component may improve.

Referring to FIGS. 14 to 16, in an example embodiment, the side margin portions M1 and M2 and the cover portions 513 and 514 may include graphene.

As described above, since the cover portions 513 and 514 and the side margin portions M1 and M2 forming the exterior of the multilayer electronic component 500 include graphene, stress applied to the multilayer electronic component in the first direction and the third direction may be effectively dispersed, such that strength and reliability of the multilayer electronic component may effectively improve.

Experimental Example

<Raman Analysis of Second Dielectric Layer>

First, a plurality of ceramic green sheets were prepared by applying a slurry including barium titanate (BaTiO—$_3$) powder on a carrier film and drying the slurry.

A sample was manufactured by forming body including a first dielectric layer and an internal electrode by applying a conductive paste for an internal electrode on the ceramic green sheet, laminating a ceramic green sheet coated with the conductive paste for an internal electrode multiple times, and firing the sheets, and forming an external electrode on the external side of the body.

In this case, by laminating a separately manufactured ceramic green sheet including graphene multiple times and inserting the sheets to the process of laminating ceramic green sheets coated with conductive paste for an internal electrode, an intermediate layer including a second dielectric layer and disposed between adjacent capacitor forming portions was formed.

Then, the sample was polished in a direction perpendicular to the second direction to a point at which the length of the sample in the second direction is half, and a Raman analysis was performed on the second dielectric layer exposed to the cross-section perpendicular to the second direction of the sample. The Raman analysis was performed under conditions of laser wavelength: 532 nm, exposure time: 10 seconds, cumulative number of times: 3 times, laser power (ND filter): 5%, and magnification: 100 times.

Figure 18:
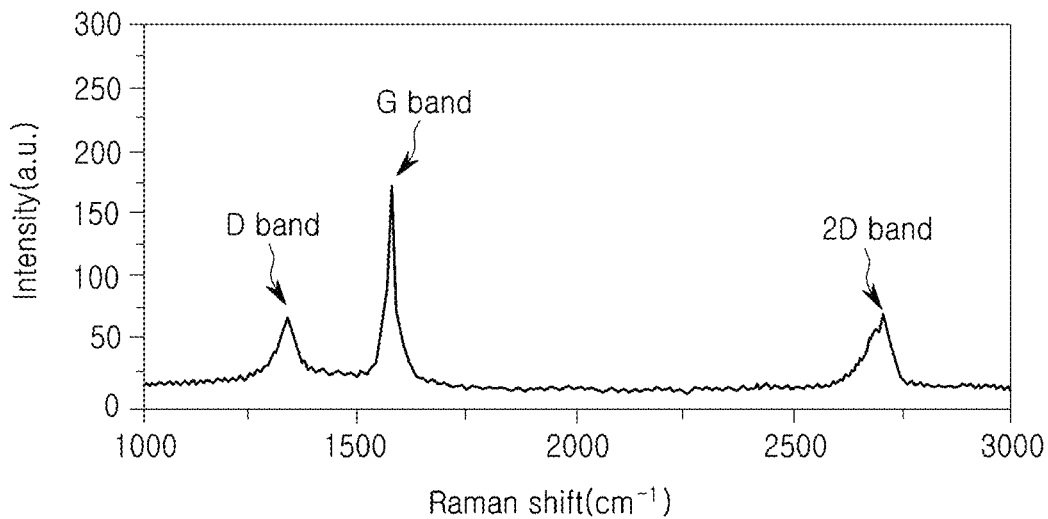
FIG. 18 is a graph illustrating a result of Raman analysis for a second dielectric layer including graphene.

FIG. 18 is a graph illustrating a result of Raman analysis for a second dielectric layer including graphene.

Referring to FIG. 18, it was confirmed that the peak in the D band was detected at 1300 to 1400 cm$^{-1}$ in Raman analysis of the second dielectric layer, and that the peak in the G band was detected at 1500 to 1600 cm$^{-1}$. Also, in the second dielectric layer, the peak in the 2D band was detected at 2600 to 2800 cm$^{-1}$ in Raman analysis. Accordingly, it may be confirmed that the second dielectric layer included graphene.

Also, it may be confirmed that intensity of the peak detected in the G band in Raman analysis of the second dielectric layer was higher than intensity of the peak detected in the D band. Accordingly, it may be confirmed that the second dielectric layer may include graphene having few defects, that is, for example, graphene in which a ratio of carbon atom is 90 at % or more.

<Evaluation of Warpage Strength>

32 inventive examples in which the intermediate layer including the second dielectric layer is disposed in the body and 32 comparative examples in which the second dielectric layer and the intermediate layer are not included were prepared. In this case, 0.5 portions by weight of graphene was added to the second dielectric layer of the inventive example based on 100 portions by weight of barium titanate (BaTiO—$_3$). In this case, other than the inclusion of the second dielectric layer, the inventive examples and comparative examples were prepared under the same conditions, and inventive examples and comparative examples had a size of 1 mm in a first direction, a size of 7 mm in the second direction, and a size of 1.8 mm in the third direction before firing.

Thereafter, each of warpage strength was measured through the three-fold warpage strength test for the invention examples and comparative examples. The warpage strength test was evaluated through a universal testing machine of TIRA, and the distance between a pair of supports supporting the sample was determined to be 5 mm. In this case, the warpage strength value may refer to the maximum stress value among the stresses measured until the sample was destroyed when a force is applied to each of the invention examples and the comparative examples in a direction perpendicular to the first direction.

Figure 19:
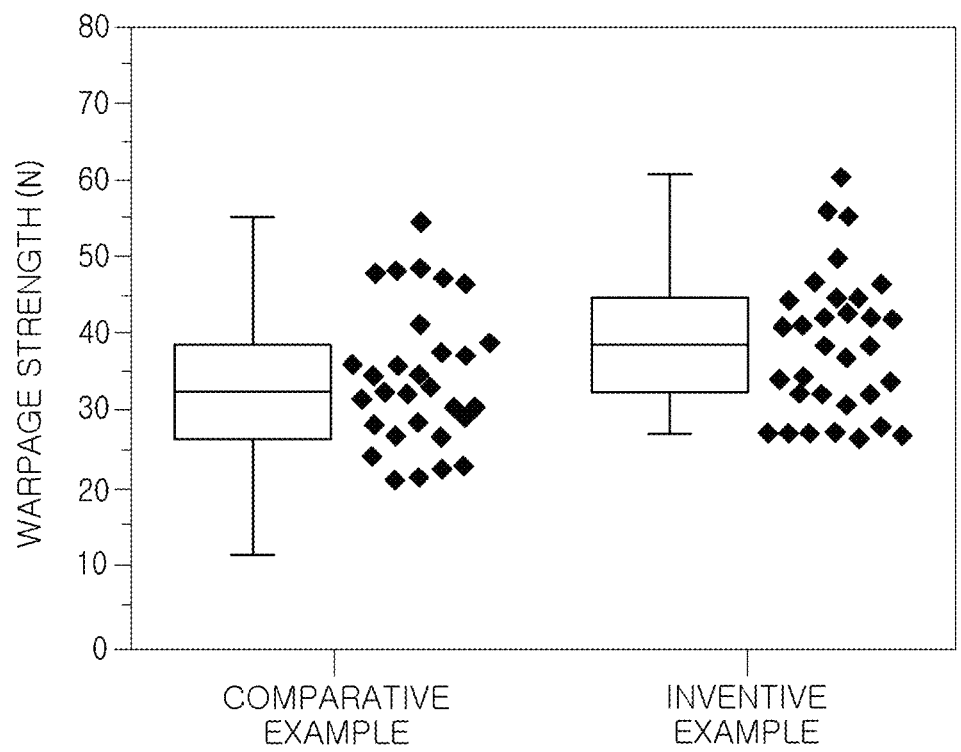
FIG. 19 is a graph illustrating measurement of warpage strength of an inventive example and a comparative example.

FIG. 19 is a graph illustrating measurement of warpage strength of the invention examples and the comparative examples.

Referring to FIG. 19, it is confirmed that the invention example had more excellent warpage strength than that of the comparative example. This is because the second dielectric layer including graphene had high strength, and accordingly, warpage strength of the multilayer electronic component may improve.

<Evaluation of Fracture Toughness>

20 invention examples in which the intermediate layer including the second dielectric layer was disposed in the body and 20 comparative examples not including the second dielectric layer were prepared according to the firing temperatures (1140° C., 1150° C., 1160° C. or 1170° C.). 0.25 portions by weight of graphene based on 100 portions by weight of barium titanate (BaTiO$_3$) was added to the second dielectric layer of the invention example, and the invention examples and comparative examples were manufactured under the same conditions and to have the same size, other than whether the second dielectric layer was included.

Thereafter, fracture toughness of the invention examples and comparative examples was measured. Fracture toughness was measured through a Vickers micro-indentation test, and when a load of 100g was applied to a central point having a half length in the second and third directions among the upper surfaces of inventive examples and comparative examples, the fracture toughness was measured through the length of the crack formed by the pressure.

Figure 20:
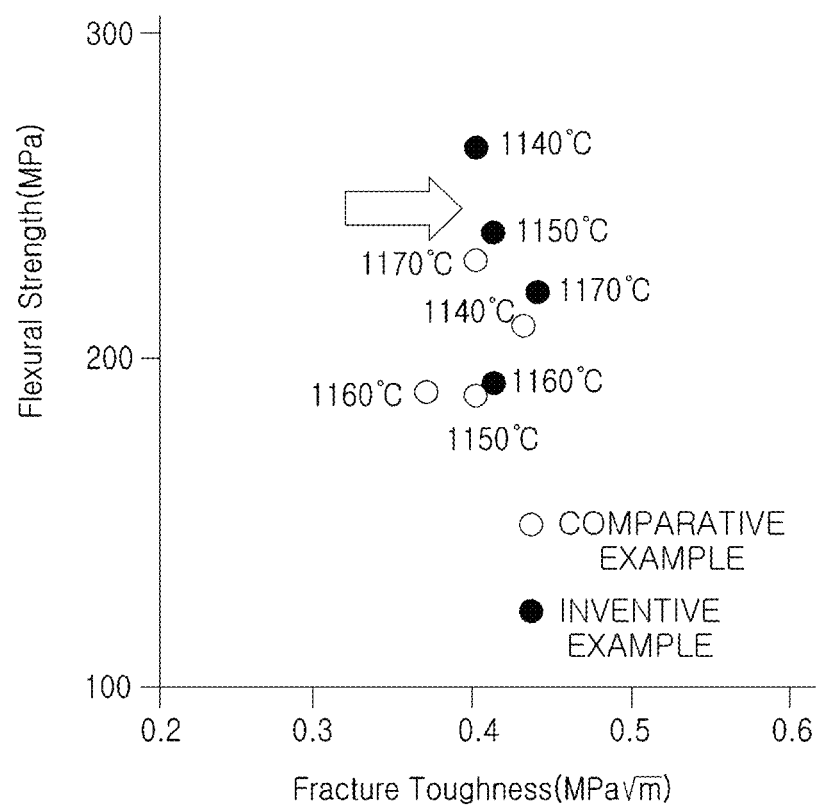
FIG. 20 is a graph illustrating measurement of fracture toughness of an inventive example and a comparative example.

FIG. 20 is a graph illustrating the measurement of fracture toughness of inventive examples and comparative examples.

More specifically, FIG. 20 is a graph illustrating the measurement of fracture toughness and warpage strength of the inventive examples and comparative examples according to the firing temperatures.

Referring to FIG. 20, it is confirmed that the invention example had higher fracture toughness than that of the comparative example. This is because the second dielectric layer including graphene had high fracture toughness, such that the second dielectric layer including graphene may prevent spread of cracks generated in the multilayer electronic component.

According to the aforementioned example embodiments, a multilayer electronic component having high-reliability by having high-strength may be provided.

Also, a multilayer electronic component having improved capacitance may be provided.

Also, a multilayer electronic component having improved moisture resistance reliability and improved breakdown voltage may be provided.

While the example embodiments have been illustrated and described above, it will be apparent to those skilled in the art that modifications and variations could be made without departing from the scope of the present invention as defined by the appended claims.

What is claimed is:

1. A multilayer electronic component, comprising:
   a plurality of capacitance forming portions including a first dielectric layer and an internal electrode disposed in a first direction, and a first intermediate layer disposed between first and second capacitance forming portions among the plurality of capacitance forming portions and including a second dielectric layer;
   a body including first and second surfaces opposing each other in the first direction, third and fourth surfaces connected to the first and second surfaces and opposing each other in a second direction, and fifth and sixth surfaces connected to the first to fourth surfaces and opposing each other in a third direction; and
   an external electrode disposed on the body and connected to the internal electrode,
   wherein the second dielectric layer includes graphene,
   wherein the first dielectric layer does not include graphene, or includes graphene in a content less than a content of graphene included in the second dielectric layer,
   wherein the body includes a cover portion disposed on an internal electrode disposed in an outermost region with respect to the first direction,
   wherein $t3<t1<t2$ is satisfied, in which $t1$ is an average thickness of the first intermediate layer, $t2$ is an average thickness of the cover portion, and $t3$ is an average thickness of the first dielectric layer, and
   wherein $t1$ and $t2$ satisfy $t1/t2 \leq 0.8$.

2. The multilayer electronic component of claim 1, wherein $t1$ and $t3$ satisfy $t1/t3 \geq 7$, in which $t1$ is an average thickness of the first intermediate layer and $t3$ is an average thickness of the first dielectric layer.

3. The multilayer electronic component of claim 1, wherein the first and second dielectric layers include a plurality of grains and grain boundaries between grains adjacent to each other, and
   wherein the graphene included in the second dielectric layer is disposed at at least one of the grain boundaries of the second dielectric layer.

4. The multilayer electronic component of claim 3, wherein the second dielectric layer includes a plurality of pieces of graphene, and
   wherein at least one of the plurality of pieces of graphene included in the second dielectric layer has one surface disposed along a surface of at least two or more of the plurality of grains included in the second dielectric layer.

5. The multilayer electronic component of claim 3, wherein $D2<D1$ is satisfied, in which $D1$ is an average particle size of the grains of the first dielectric layer, and $D2$ is an average particle size of the grains of the second dielectric layer.

6. The multilayer electronic component of claim 5, wherein $(D1-D2)/D1 \leq 0.3$ is satisfied.

7. The multilayer electronic component of claim 1, wherein peaks in a D-band and a G-band are detected in the second dielectric layer in Raman analysis of the second dielectric layer.

8. The multilayer electronic component of claim 7, wherein no peaks are detected in the D band and the G band simultaneously in the first dielectric layer in Raman analysis of the first dielectric layer, or peaks in the D band and the G band having lower intensity than that of the peaks in the D band and the G band detected in the second dielectric layer are detected in the first dielectric layer.

9. The multilayer electronic component of claim 7, wherein a ratio of intensity of the peak detected in the D band to intensity of the peak detected in the G band in the second dielectric layer is 0.03 to 0.5.

10. The multilayer electronic component of claim 7, wherein the D band is detected at 1300-1400 $cm^{-1}$, and wherein the G band is detected at 1500-1600 $cm^{-1}$.

11. The multilayer electronic component of claim 1, wherein the second dielectric layer includes a barium titanate ($BaTiO_3$)-based main component, and
    wherein a content of graphene included in the second dielectric layer based on 100 portions by weight of the main component is 0.1 portion by weight to 1.0 portion by weight.

12. The multilayer electronic component of claim 1, wherein graphene included in the second dielectric layer has a long axis of 0.3 μm to 10 μm.

13. The multilayer electronic component of claim 1, wherein the first dielectric layer has an average thickness of 0.4 μm or less.

14. The multilayer electronic component of claim 1, wherein the body further includes a second intermediate layer, and
    wherein the second intermediate layer is disposed between the second capacitance forming portion and a third capacitance forming portion among the plurality of capacitance forming portions.

15. The multilayer electronic component of claim 1, wherein the plurality of capacitance forming portions are arranged in the first direction.

16. The multilayer electronic component of claim 1, wherein the internal electrode is spaced apart from the fifth and sixth surfaces, and is connected to the third or fourth surface, and
    wherein the first intermediate layer is connected to the third to sixth surfaces of the body.

17. The multilayer electronic component of claim 1, wherein the body includes a cover portion disposed on an internal electrode disposed in an outermost region with respect to the first direction, and the cover portion includes graphene.

18. The multilayer electronic component of claim 17, wherein peaks in a D band and a G band are detected in the cover portion in Raman analysis of the cover portion.

19. The multilayer electronic component of claim 1,
wherein the internal electrode is connected to the fifth and sixth surfaces, and is connected to the third or fourth surface,
wherein the first intermediate layer is connected to the third to sixth surfaces of the body, and
wherein a side margin portion is disposed on the fifth and sixth surfaces.

20. The multilayer electronic component of claim 19, wherein the side margin portion includes graphene.

21. The multilayer electronic component of claim 20, wherein peaks in a D band and a G band are detected in the side margin portion in Raman analysis of the side margin portion.

22. The multilayer electronic component of claim 20, wherein the body includes a cover portion disposed on an internal electrode disposed in an outermost region with respect to the first direction, and the cover portion includes graphene.

23. A multilayer electronic component, comprising:
a plurality of capacitance forming portions including a first dielectric layer and an internal electrode disposed in a first direction, and a first intermediate layer disposed between first and second capacitance forming portions among the plurality of capacitance forming portions and including a second dielectric layer;
a body including first and second surfaces opposing each other in the first direction, third and fourth surfaces connected to the first and second surfaces and opposing each other in a second direction, and fifth and sixth surfaces connected to the first to fourth surfaces and opposing each other in a third direction; and
an external electrode disposed on the body and connected to the internal electrode,
wherein the second dielectric layer includes graphene,
wherein t3<t1 is satisfied, in which t1 is an average thickness of the first intermediate layer and t3 is an average thickness of the first dielectric layer,
wherein the body includes a cover portion disposed on an internal electrode disposed in an outermost region with respect to the first direction,
wherein t3<t1<t2 is satisfied, in which t2 is an average thickness of the cover portion, and
wherein t1 and t2 satisfy t1/t2≤0.8.

24. The multilayer electronic component of claim 23,
wherein the body further includes a second intermediate layer, and
wherein the second intermediate layer is disposed between the second capacitance forming portion and a third capacitance forming portion among the plurality of capacitance forming portions.

25. The multilayer electronic component of claim 23,
wherein the internal electrode is spaced apart from the fifth and sixth surfaces, and is connected to the third or fourth surface, and
wherein the first intermediate layer is connected to the third to sixth surfaces of the body.

26. The multilayer electronic component of claim 23, wherein the body includes a cover portion disposed on an internal electrode disposed in an outermost region with respect to the first direction, and the cover portion includes graphene.

27. The multilayer electronic component of claim 23,
wherein the internal electrode is connected to the fifth and sixth surfaces, and is connected to the third or fourth surface,
wherein the first intermediate layer is connected to the third to sixth surfaces of the body, and
wherein a side margin portion is disposed on the fifth and sixth surfaces.

28. The multilayer electronic component of claim 27, wherein the side margin portion includes graphene.

29. The multilayer electronic component of claim 28, wherein the body includes a cover portion disposed on the internal electrode disposed in an outermost region with respect to the first direction, and the cover portion includes graphene.

* * * * *